United States Patent
Hoshii et al.

(10) Patent No.: US 8,243,329 B2
(45) Date of Patent: Aug. 14, 2012

(54) PRINTING CONTROL DEVICE, PRINT DATA GENERATION DEVICE, PRINTING SYSTEM AND PRINTING CONTROL PROGRAM

(75) Inventors: Jun Hoshii, Shiojiri (JP); Takashi Ito, Hata-machi (JP); Hisanori Nakajima, Matsamoto (JP); Kazuhisa Saka, Sapporo (JP); Masanori Ishida, Kagoshima (JP); Fumio Tokutomi, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 847 days.

(21) Appl. No.: 12/317,696

(22) Filed: Dec. 22, 2008

(65) Prior Publication Data

US 2009/0195845 A1     Aug. 6, 2009

(30) Foreign Application Priority Data

Dec. 21, 2007  (JP) ................................. 2007-330785
Dec. 1, 2008  (JP) ................................. 2008-306357

(51) Int. Cl.
  *H04N 1/04*   (2006.01)
  *G06K 1/00*   (2006.01)
(52) U.S. Cl. .......... 358/1.9; 358/518; 358/509; 358/522
(58) Field of Classification Search .................... 358/1.9, 358/518, 509, 522
See application file for complete search history.

(56) References Cited

U.S. PATENT DOCUMENTS

| | | | | |
|---|---|---|---|---|
| 5,596,510 A | * | 1/1997 | Boenke | ......................... 358/523 |
| 5,612,902 A | | 3/1997 | Stokes | |
| 2003/0098896 A1 | | 5/2003 | Berns et al. | |
| 2004/0109178 A1 | * | 6/2004 | Couwenhoven et al. | ...... 358/1.9 |

FOREIGN PATENT DOCUMENTS

| | | |
|---|---|---|
| EP | 1139654 A | 10/2001 |
| EP | 1146726 A | 10/2001 |
| JP | 2005-508125 A | 3/2005 |
| JP | 2006-082460 | 3/2006 |
| WO | WO/03/039134 A1 | 5/2003 |

* cited by examiner

*Primary Examiner* — Houshang Safaipour
(74) *Attorney, Agent, or Firm* — Nutter McClennen & Fish LLP; John J. Penny, Jr.

(57) ABSTRACT

A printing control device that specifies to a printing apparatus a coloring material volume set which is a combination of usage amounts of coloring materials when the printing apparatus executes printing by depositing a plurality of coloring materials onto a recording medium, including: a print data acquisition unit that acquires print data of pixels having an information area for storing an index associated with the coloring material volume set; a color conversion unit that acquires the coloring material volume set corresponding to the index stored in the pixel; and a printing control unit that executes printing by specifying to the printing apparatus the coloring material volume set acquired by the color conversion unit.

6 Claims, 27 Drawing Sheets

FIG. 8

Index table

| Index | RGB for display | Colorimetric data (target colorimetric value) [L*,a,b*] | | |
|---|---|---|---|---|
| | | D50 | D55 | D65 |
| 00000 | 20,15,125 | 21,32,10 | 21,32,10 | 21,33,10 |
| 00001 | 84,33,15 | 50,2,3 | 51,2,3 | 5,3,3 |
| 00002 | 200,42,125 | 60,-30,22 | 60,-30,22 | 60,-30,22 |
| 00003 | 70,128,125 | 7,9,15 | 7,9,15 | 7,9,15 |

FIG. 13

1D-LUT

| Index | Ink volume set C,M,Y,K,lc,lm |
|---|---|
| 00000 | 3,21,5,10,33,53 |
| 00001 | 84,56,120,15,87,51 |
| 00002 | 204,42,12,3,1,0 |
| 00003 | 120,150,11,10,31,32 |

FIG. 17

Spectral reflectivity database (RDB)

| Ink volume set | Spectral reflectivity(%) |
|---|---|
| C,M,Y,K,lc,lm | $\lambda$ =320 330 $\cdots$ 840(nm) |
| 0,0,0,0,0,0 | 100 100 $\cdots$ 100 |
| 51,0,0,0,0,0 | |
| 102,0,0,0,0,0 | |
| | |
| | |
| | |
| | |
| | |
| | |

Plane of CM ink volumes

FIG. 18A Spectral neugebauer model $$R(\lambda) = a_w R_w(\lambda) + a_c R_c(\lambda) + \cdots + a_k R_k(\lambda)$$

$$a_w = (1 - f_c)(1 - f_m)(1 - f_y)$$
$$a_c = f_c(1 - f_m)(1 - f_y)$$
$$a_m = (1 - f_c)f_m(1 - f_y)$$
$$a_y = (1 - f_c)(1 - f_m)f_y$$
$$a_r = (1 - f_c)f_m f_y$$
$$a_g = f_c(1 - f_m)f_y$$
$$a_b = f_c f_m(1 - f_y)$$
$$a_k = f_c f_m f_y$$

FIG. 18B Murray-davis model $$f_c = f_{1D-LUT}(d_c)$$

FIG.19A Cellular yule-nielsen spectral neugebauer model

FIG.19B Ink area coverage fc(d)

FIG.19C Calculation of spectral reflectivity $R(\lambda)$ $$R(\lambda) = \left(\sum a_i R_i(\lambda)^{1/n}\right)^n$$

$$= \left(a_{11}R_{11}(\lambda)^{1/n} + a_{12}R_{12}(\lambda)^{1/n} + a_{21}R_{21}(\lambda)^{1/n} + a_{22}R_{22}(\lambda)^{1/n}\right)^n$$

$$a_{11} = (1-f_c)(1-f_m)$$
$$a_{12} = (1-f_c)f_m$$
$$a_{21} = f_c(1-f_m)$$
$$a_{22} = f_c f_m$$

26A

26B

PRINTING CONTROL DEVICE, PRINT DATA GENERATION DEVICE, PRINTING SYSTEM AND PRINTING CONTROL PROGRAM

CROSS-REFERENCE TO RELATED APPLICATIONS

The entire disclosure of Japanese Patent Application No. 2007-330785, filed Dec. 21, 2007, and Japanese Patent Application No. 2008-306357, filed Dec. 1, 2008, are expressly incorporated by reference herein.

BACKGROUND

1. Technical Field

The present invention relates to a printing control device, a print data generation device, a printing system and printing control program, and more particularly, to a printing control device, a print data generation device, a printing system and a printing control program for reproducing a target.

2. Related Art

JP-T-2005-508125 proposes a printing method which pays particular attention to spectral reproducibility. According to JP-T-2005-508125, in order to achieve printing which coincides with a target image both spectrally and calorimetrically, a printing model is used to optimize the combination of printer colors (the ink volumes of C, M, Y, K, O and G) in order to match a target spectral reflectivity (target spectrum). By carrying out printing based on these printer colors (the ink volumes of C, M, Y, K, O and G), it is possible to reproduce a target image spectrally, and consequently it is possible to obtain a print result which has good reproducibility in colorimetric terms as well.

However, there may be cases where it is not necessary to achieve spectral reproducibility throughout the whole of the printed image. For example, in a color chart containing an arrangement of a plurality of color samples (color patches) which reproduce a target spectral reflectivity, there is no requirement to achieve spectral reproducibility in the regions other than the color patches. In cases such as these, it is thought that drawbacks of the following kind will arise if spectral reproducibility is also achieved unnecessarily in regions where spectral reproducibility is not required. Firstly, there is a drawback in that printing is carried out under unsuitable printing conditions. This is because the printer colors (the ink volumes of C, M, Y, K, O and G) for achieving spectral reproducibility are not necessarily optimal in relation to printing performance factors apart from the object of achieving spectral reproducibility. For example, due to the demand for spectral reproducibility, there have been problems such as an overall increase in the consumption of coloring material, such as ink, decline in the tonal characteristics of the reproduced colors, and so on. Secondly, there is a conceivable drawback in that the calculation processing load is increased unnecessarily. In other words, since it is necessary to optimize a large number of variable amounts in calculating the printer colors (the C, M, Y, K, O and G ink volumes) which allow reproduction of the target spectral reflectivity, then a problem arises in that the processing load increases if spectral reproducibility is sought for all of the pixels used in the printed image.

SUMMARY

The invention provides a printing control device, a print data generation device, a print system and a printing control program which ensure spectral reproducibility only in required regions.

A print data acquisition unit acquires print data of pixels having an information area for storing an index associated with a coloring material volume set. A color conversion unit then acquires the coloring material volume set corresponding to the index stored in the pixel. Furthermore, a printing control unit causes printing to be executed by specifying to the printing apparatus the coloring material volume set acquired by the color conversion unit.

It is preferable that color information representing a color can be stored, in place of an index, in the information areas of the plurality of pixels. In this case also, the coloring material volume set corresponding to the index is acquired in respect of pixels which have an index stored in the data area. However, a coloring material volume set corresponding to a color represented by color information is acquired in respect of those pixels which have color information stored in the data area. Thereby, it is possible to use different color conversion techniques selectively.

Furthermore, it is preferable that the coloring material volume set associated with the index is a coloring material volume set which produces a prescribed target spectral reflectivity or a target prescribed color value under a plurality of light sources, as a result of printing on the recording medium. By taking the actual spectral reflectivity that is reproduced on the recording medium as the target, it is possible to obtain print results which have high spectral reproducibility in respect of the prescribed pixels. Furthermore, by taking the color values under a plurality of light sources as the target of the spectral reproducibility, it is possible to achieve color reproducibility which is not dependent on the light source, and consequently it is possible to achieve spectral reproducibility.

Moreover, as one example of a preferable composition of the print data, the information area includes a second area that stores either one of the index and the color information, and a first area that stores identification information identifying which of the index and the color information is stored in the second area. By this means, it is possible to adopt a common external form for the structure of the data belonging to the first and second pixels, and furthermore, the color conversion unit is able to judge whether the respective pixels store color information or an index.

Moreover, it is preferable that a database which associates the index with the target should be prepared, and that a database which stipulates the association between the ink volume set and the index should be prepared in advance on the basis of this database. In other words, a database creation unit is provided, and as well as acquiring a database from the database creation unit, the ink volume set which allows reproduction of the target on the recording medium is predicted and furthermore, a new database which stipulates the association between the predicted ink volume set and the index is created. Thereby, the color conversion unit is able to acquire the coloring material volume set in respect of pixels where an index is stored, by referring to the previously created database.

Moreover, the technical idea of the invention is not limited to being realized in a concrete printing control device and can also be realized as a method. More specifically, the invention can be specified as a method having steps which correspond to the respective units of the above-referenced printing control device. Of course, if the above-referenced units are realized by the printing control device reading in a program, then the technical idea of the invention can also be realized in the program which causes execution of functions corresponding to the units, or recording media of various types on which this program is recorded. The printing control device of the invention is not limited to a single device, and can of course be distributed over a plurality of devices. For example, the units of the printing control device can be distributed in both a printer, and a printer driver which is executed by a personal computer. More specifically, the invention can be realized in a print data generation device which generates the print data, and the invention can also be realized in a printing control device which executes printing control on the basis of previously generated print data. Furthermore, the units of the printing control device of the invention can also be incorporated into a printing apparatus, such as a printer.

BRIEF DESCRIPTION OF THE DRAWINGS

The invention will be described with reference to the accompanying drawings, wherein like numbers reference like elements.

FIG. 8 shows an index table;

FIG. 13 shows a 1D-LUT;

FIG. 17 shows a spectral reflectivity database;

DESCRIPTION OF EXEMPLARY EMBODIMENTS

An embodiment of the invention is described below in the following sequence.

1. Composition of printing control device
2. Print data generation process
3. Printing control process
   3-1 1D-LUT generation process
   3-2 Printing control data generation process
4. Spectral printing model
5. Modification examples
   5-1 Modification example 1
   5-2 Modification example 2
   5-3 Modification example 3
   5-4 Modification example 4
   5-5 Modification example 5
   5-6 Modification example 6
   5-7 Modification example 7
   5-8 Modification example 8

1. COMPOSITION OF PRINTING CONTROL DEVICE

Figure 1:
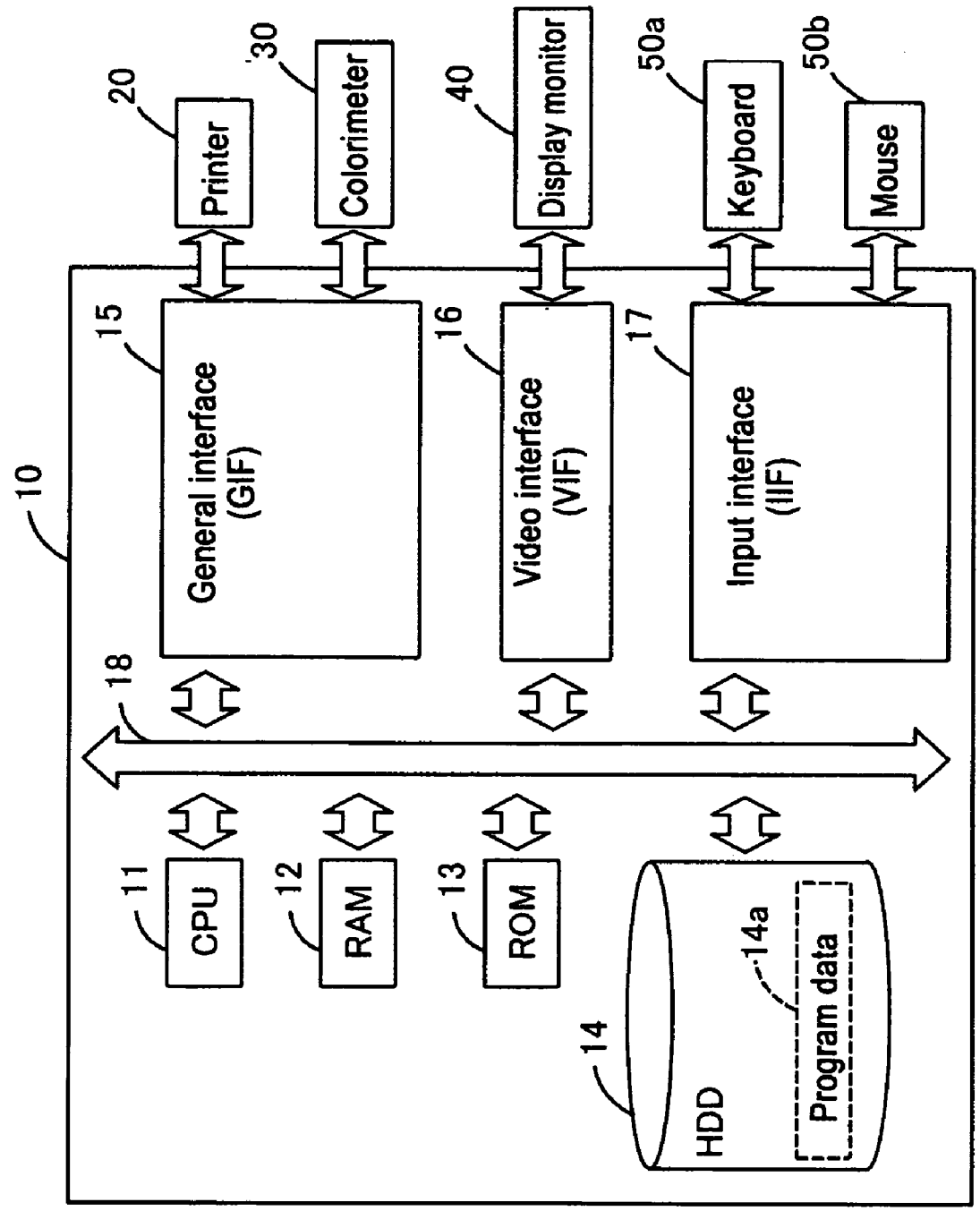
FIG. 1 shows a block diagram of the hardware composition of a printing control device.

FIG. 1 shows the hardware composition of a printing control device according to one embodiment of the invention. In FIG. 1, the printing control device is principally constituted by a computer 10, and the computer 10 is composed of a CPU 11, a RAM 12, a ROM 13, a hard disk drive (HDD) 14, a general interface (GIF) 15, a video interface (VIF) 16, an input interface (IIF) 17 and a bus 18. The bus 18 achieves data communications between the respective elements 11 to 17 which constitute the computer 10, these communications being controlled by means of a chipset, or the like, which is not illustrated. Program data 14a for executing various programs including an operating system (OS) is stored on the HDD 14, and the CPU 11 expands this program data 14a into the RAM 12 and carries out calculations in accordance with the program data 14a. The GIF 15 provides an interface based on the USB standard, for example, and serves to connect an external printer 20 and a calorimeter 30 to the computer 10. The VIF 16 connects the computer 10 to an external display monitor 40 and provides an interface for displaying an image on the display 40. The IIF 17 connects the computer 10 with an external keyboard 50a and a mouse 50b, and provides an interface whereby the computer 10 acquires input signals from the keyboard 50a and the mouse 50b.

Figure 2:
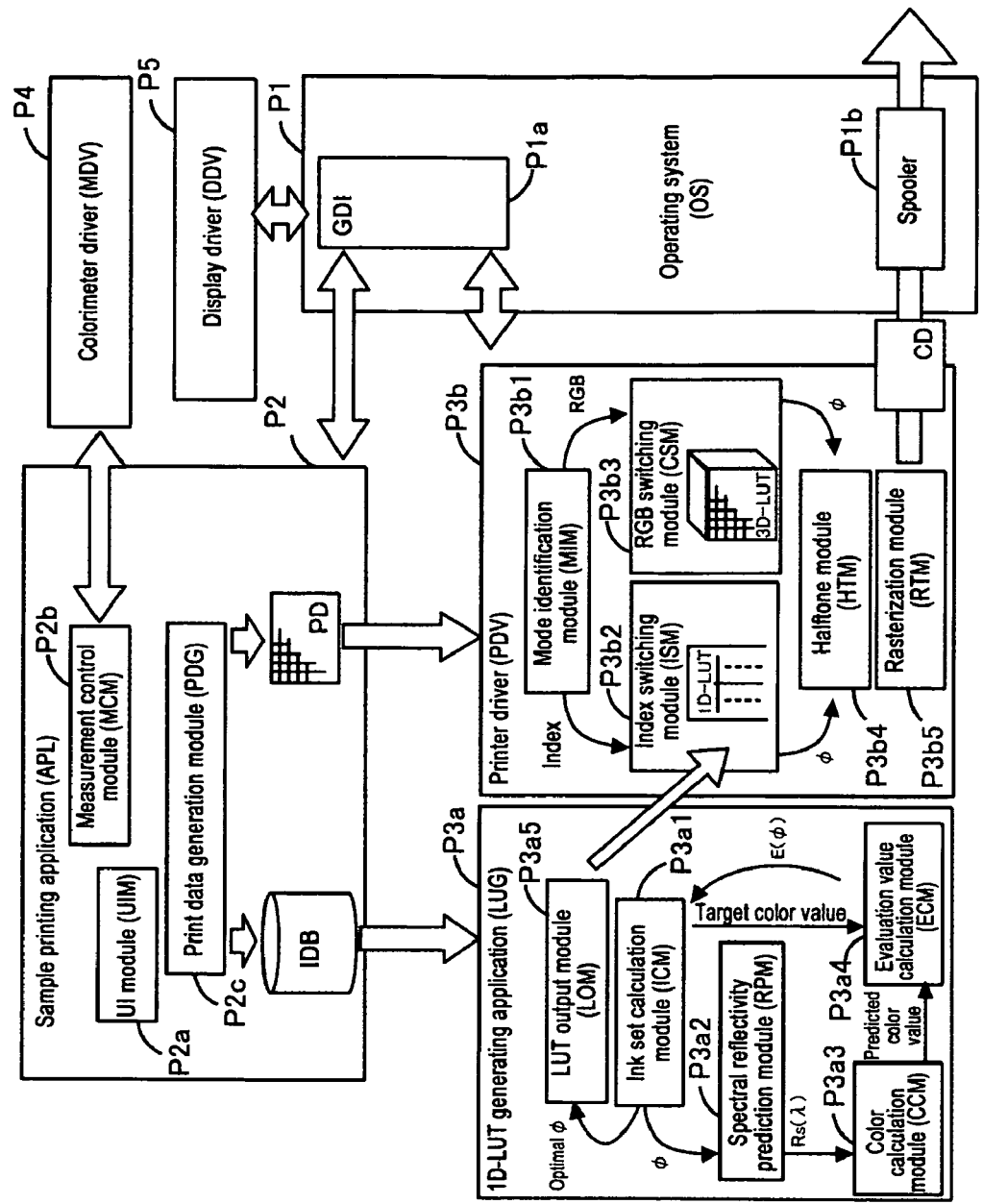
FIG. 2 shows a block diagram of the software composition of a printing control device.

FIG. 2 shows the software composition of the program executed by the computer 10, together with an approximate depiction of the flow of data. In FIG. 2, the computer 10 principally executes an OS P1, a sample print application (APL) P2, a 1D-LUT generating application (LUG) P3a, a printer driver (PDV) P3b, a colorimeter driver (MDV) P4 and a display driver (DDV) P5. The OS P1 provides an image device interface (GDI) P1a and a spooler P1b as one API which can be used by various programs, and the GDI P1a is called in response to a request from the APL P2, and the PDV P3b and DDV P5 are called in response to a request from the GDI P1a. The GDI P1a provides a general framework for the computer 10 to control image output in the image output device, such as the printer 20 or display monitor 40, while the PDV P3b and the DDV P5 provide device-specific processing for the printer 20 or display monitor 40. Furthermore, the spooler P1b is interposed between the APL P2, the PDV P3b and the printer 20, and serves to control print jobs, and the like. The APL P2 is an application program for printing a sample chart SC, which generates print data PD in an RGB bitmap format and output this print data PD to the GDI P1a. Furthermore, in generating the print data PD, target calorimetric data MD is acquired from the MDV P4. The MDV P4 controls the colorimeter 30 in accordance with a request from the APL P2 and outputs the calorimetric data MD obtained under this control procedure to the APL P2.

The print data PD generated by the APL P2 is output to the PDV P3b via the GDI P1a and the spooler P1b, and the PDV P3b executes processing for generating printing control data CD which can be output to the printer 20 on the basis of the print data PD. The printing control data CD generated by the PDV P3b is output to the printer 20 via the spooler P1b provided by the OSP 1, and a sample chart SC is printed onto the printing paper by means of the printer 20 operating on the basis of this printing control data CD. In the foregoing, the overall flow of processing was described in general terms, but the processing executed by the programs P1 to P4 is described in detail below with reference to a flowchart.

2. PRINT DATA GENERATION PROCESS

Figure 3:
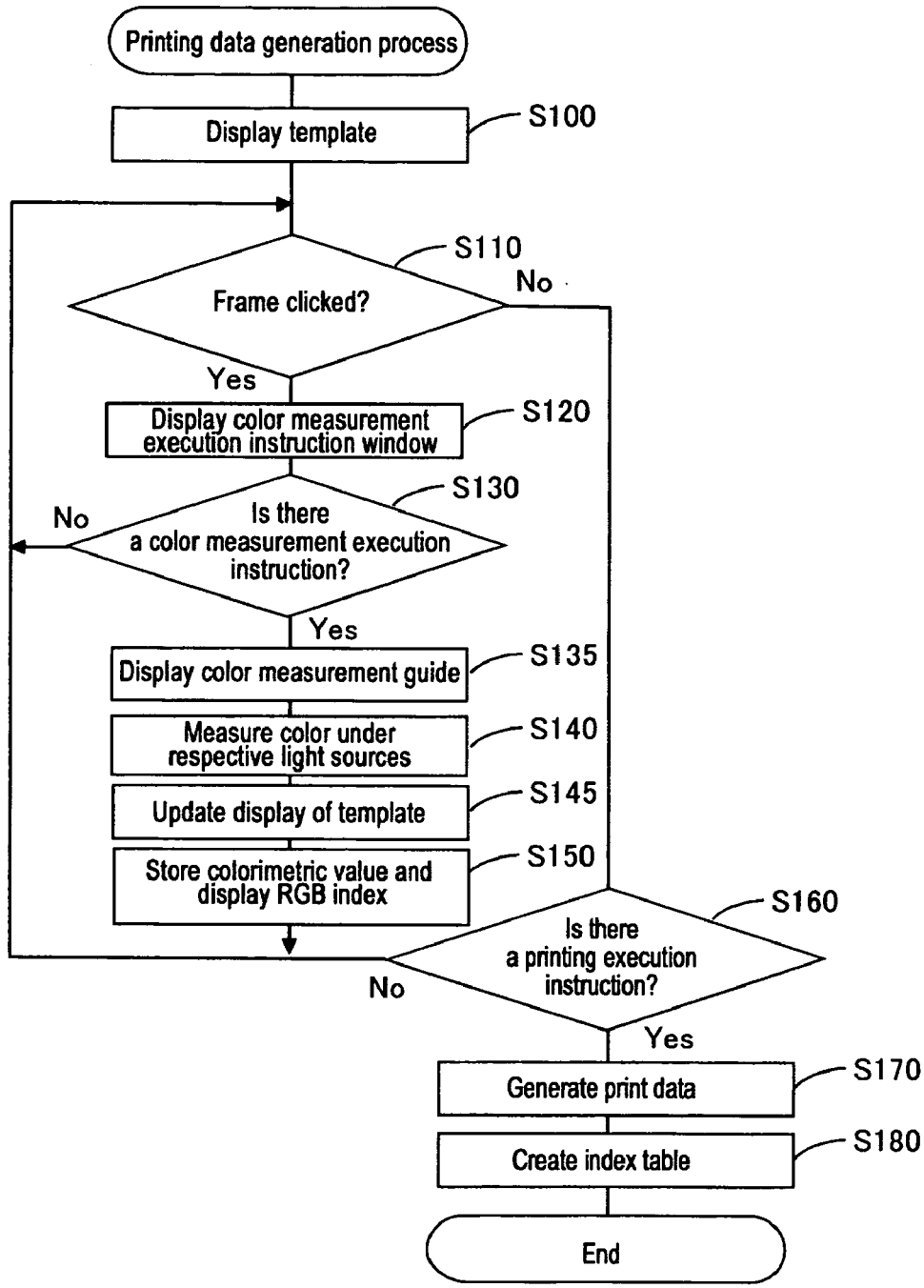
FIG. 3 shows a flowchart of the flow of a print data generation process.

FIG. 3 shows the sequence of print data generation processing which is executed by the APL P2. As shown in FIG. 2, the APL P2 is constituted by a UI module (UIM) P2a, a measurement control module (MCM) P2b, and a print data generation module (PDG) P2c, and these respective modules P2a, P2b and P2c execute the steps shown in FIG. 3. At step S100, the UIM P2a displays a UI screen for receiving a print instruction which commands the printing of a sample chart SC, via the GDI P1a and the DDV P5. The UI screen provides a display which shows a template of the sample chart SC.

Figure 4:
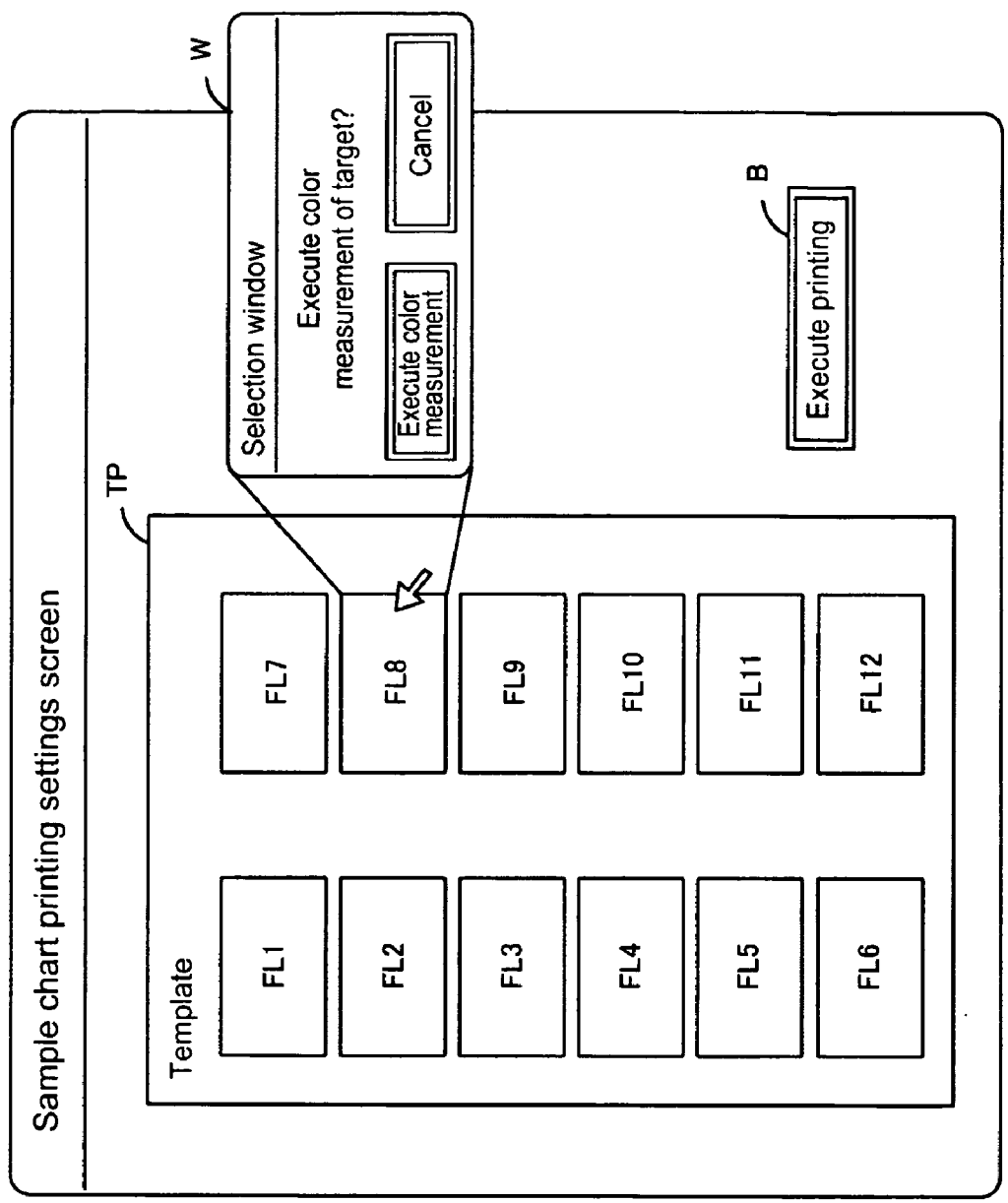
FIG. 4 shows one example of a UI screen.

FIG. 4 shows one example of the UI screen. In FIG. 4, a template TP is displayed and this template TP contains twelve frames FL1 to FL12 for laying out the color patches. On this UI screen, the respective frames FL1 to FL12 can be selected by clicking the mouse 50b, and when a frame FL1 to FL12 is clicked, a selection window W for instructing whether or not to start color measurement is displayed. Furthermore, on the UI screen, a button B is provided for instructing whether or not to execute printing of the sample chart SC. At step S110, the UIM P2a detects the clicking of the respective frames FL1 to FL12 by the mouse 50b and if a click is detected, displays a selection window W for instructing whether or not to start color measurement at step S120. At step S130, the clicking of the mouse 50b on the selection window W is detected and if the "Cancel" button is clicked, then the procedure returns to step S110. On the other hand, if the "Execute color measurement" button is clicked, then at step S135, the UIM P2a provides a display for guiding through color measurement. In the embodiment, it is necessary to carry out color measurement of one target TG under light sources of five types (namely, a D50 light source, a D55 light source and a D65 light source which are standard daylight sources, an A light source which is an incandescent lamp light source, and an F11 light source which is a fluorescent lamp light source), and therefore the user is guided so as to carry out color measurement sequentially while switching the light source used.

The calorimetric target TG used in the embodiment means the surface of an object which is the target of spectral reproduction, and this corresponds, for example, to the surface of a manmade object formed by another printing apparatus or application device, or the like, or the surface of a natural object, or the like. At step S140, a particular target TG is subjected to color measurement by irradiating the light sources of five types in sequence. Thereby, the MCM P2b acquires colorimetric data MD consisting of five colorimetric values (target color values) for the one target, from the MDV P4. Desirably, the respective target color values are acquired in terms of an absolute color space, and in the embodiment, L*a*b* values in a CIELAB color space are acquired as the target color values which constitute the calorimetric data MD.

Furthermore, the target color value under the D65 light source which is the most standard light source is converted to an RGB value using a prescribed RGB profile, and this RGB value is acquired as an RGB value for display purposes (display RGB value). The RGB profile is a profile which stipulates an isochromatic relationship between the CIELAB color space which forms an absolute color space and the RGB color space of the embodiment. For example, an ICC profile can be used as the RGB profile.

At step S145, the frame FL1 to FL12 which has been clicked on the template TP is updated to a blocked-in display using the display RGB value. By this means, it is possible to gain a visual appreciation on the UI screen of the color of the target TG with the D65 light source, which is the standard light source. When step S145 has been completed, a unique index is generated at step S150, and this index is stored together with the display RGB value and the positional information of the frame FL1 to FL12 clicked at step S110, in the RAM 12, in association with the colorimetric data MD consisting of five target color values. When step S150 is completed, the procedure returns to step S110 and the steps S120 to S150 are repeated. Thereby, another frame FL1 to FL12 is selected and color measurement of a further target TG is carried out for this other frame FL1 to FL12. In the embodiment, twelve mutually different targets TG1 to TG12 are prepared and target color values under five different light sources are acquired as colorimetric data MD respectively for each of the targets TG1 to TG12. Consequently, at step S150, data which associates calorimetric data MD consisting of five target color values, a unique index, and a display RGB value is stored successively in the RAM for each of the frames FL1 to FL12. The index should be generated in such a manner that each of the index values is unique, and it may be generated by increments or by non-repeating random numbers.

Figure 5:
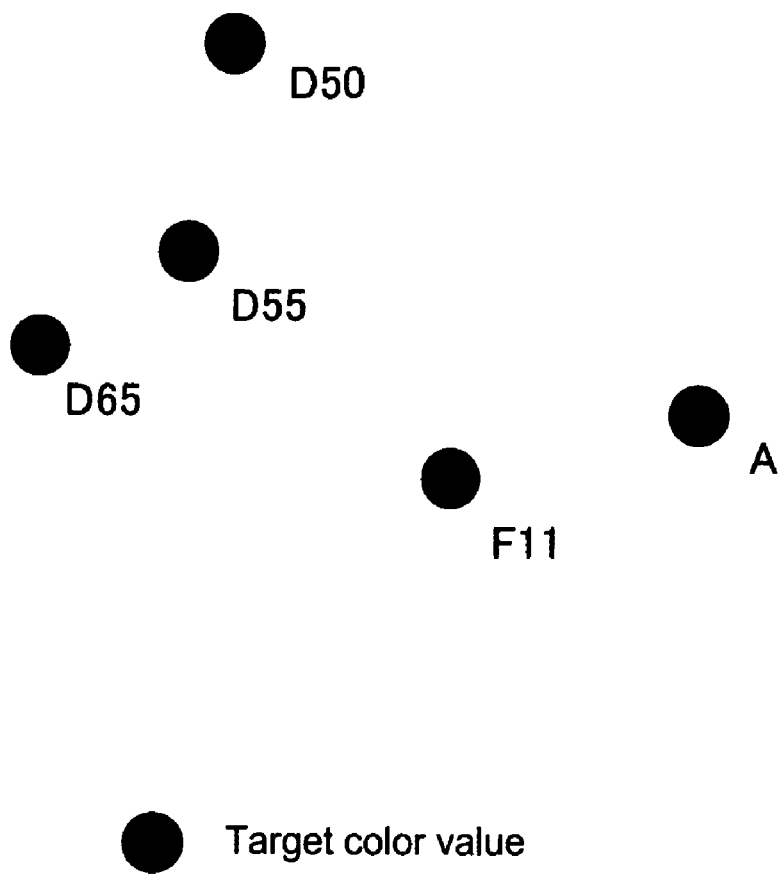
FIG. 5 shows a diagram plotting target color values.

FIG. 5 shows a case where target color values obtained for a particular target TG have been plotted in a CIELAB color space. As shown in FIG. 5, even if color measurement is carried out for a single target TG, different target color values are acquired depending on the light source used during color measurement. This phenomenon of different target color values under a plurality of different light sources is called metamerism, and each respective target TG has different metameric properties. This metamerism is dependent on the spectral reflectivity $R(\lambda)$ of the respective targets, and even in the case of respective targets for which the same target color value has been obtained with a particular light source, if the spectral reflectivity $R(\lambda)$ of the targets is different, then this means that they will have different target color values under a different light source.

Figure 6:
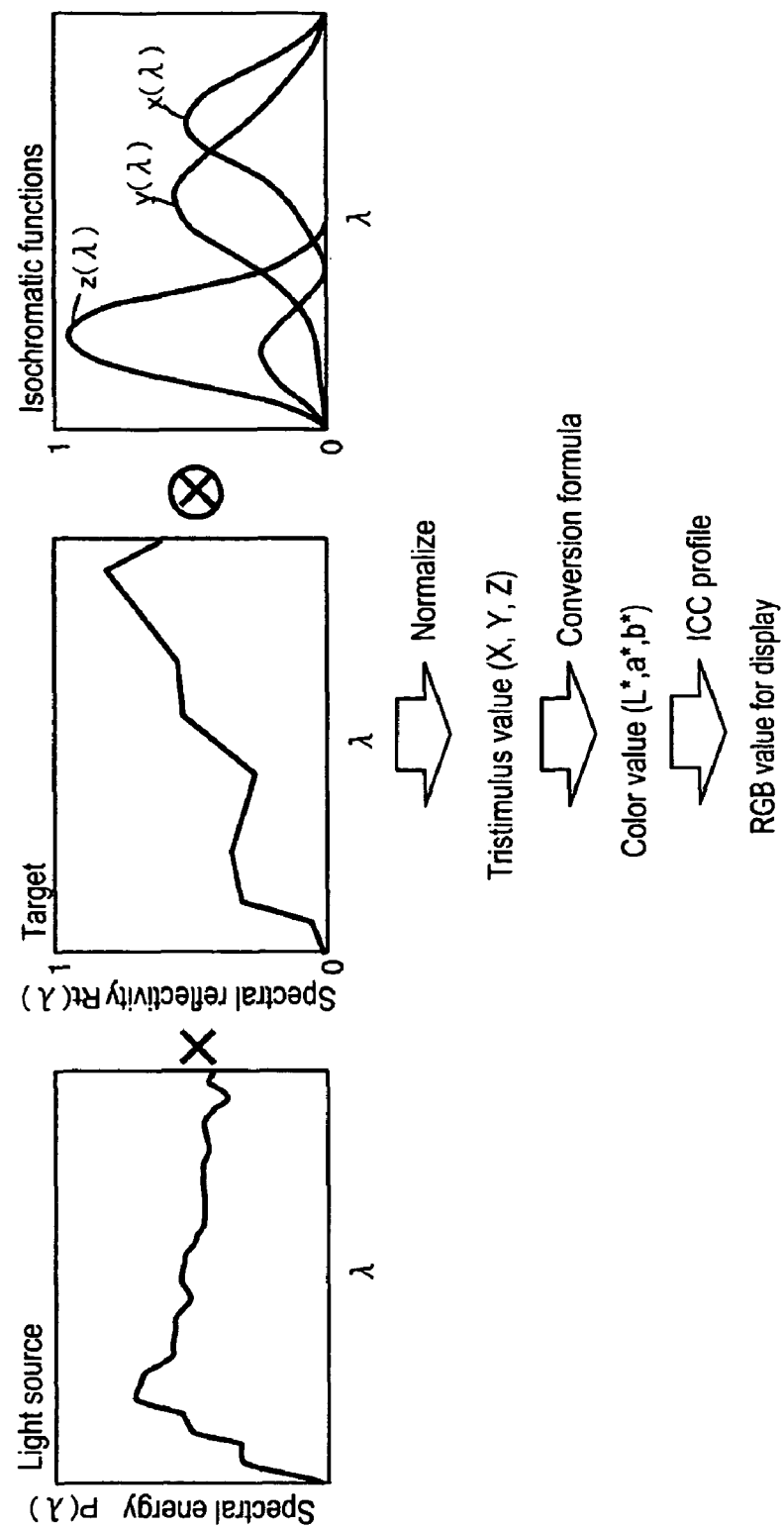
FIG. 6 describes calculation for deriving color values on the basis of spectral reflectivity.

FIG. 6 describes processing up to the acquisition of colorimetric values under a plurality of light sources from a target TG having a particular spectral reflectivity. For example, a particular target TG has a target spectral reflectivity $R_t(\lambda)$ which is non-uniform over the whole visible wavelength region as shown in FIG. 6. On the other hand, the respective light sources have mutually different distributions of the spectral energy $P(\lambda)$, and the spectral energy of the reflected light of respective wavelengths when a D65 light source is irradiated onto the target TG is given by the product of the target spectral reflectivity $R_t(\lambda)$ and the spectral energy $P(\lambda)$, for each wavelength. Moreover, by convolving the isochromatic functions $x(\lambda)$, $y(\lambda)$, $z(\lambda)$ which correspond to the spectral sensitivity characteristics of a human observer respectively with the energy spectrum of the reflected light and then normalizing using a coefficient k, a tristimulus value X, Y, Z can be obtained. When the foregoing is expressed in terms of a formula, Formula (1) below is obtained.

Expression 1

$$X = k\int P(\lambda) R_t(\lambda) x(\lambda) d\lambda$$

$$Y = k\int P(\lambda) R_t(\lambda) y(\lambda) d\lambda$$

$$Z = k\int P(\lambda) R_t(\lambda) z(\lambda) d\lambda \quad \Lambda(1)$$

An L*a*b* value can be obtained as the color value by converting the tristimulus value X, Y, Z using a prescribed conversion formula. At the stage of the energy spectrum of the reflected light, different spectra are produced for each light source, and therefore the target color value that is obtained ultimately also differs for each light source as shown in FIG. 5.

At step S110, if a click on one of the frames FL1 to FL12 is not detected, then at step S160, it is detected whether or not button B which causes printing of a sample chart SC to be executed has been clicked, and if no such click is detected, then the procedure returns to step S110. On the other hand, if a click of button B which causes printing of a sample chart SC to be executed is detected, then at step S170, the PDG P2c generates print data PD.

Figure 7:
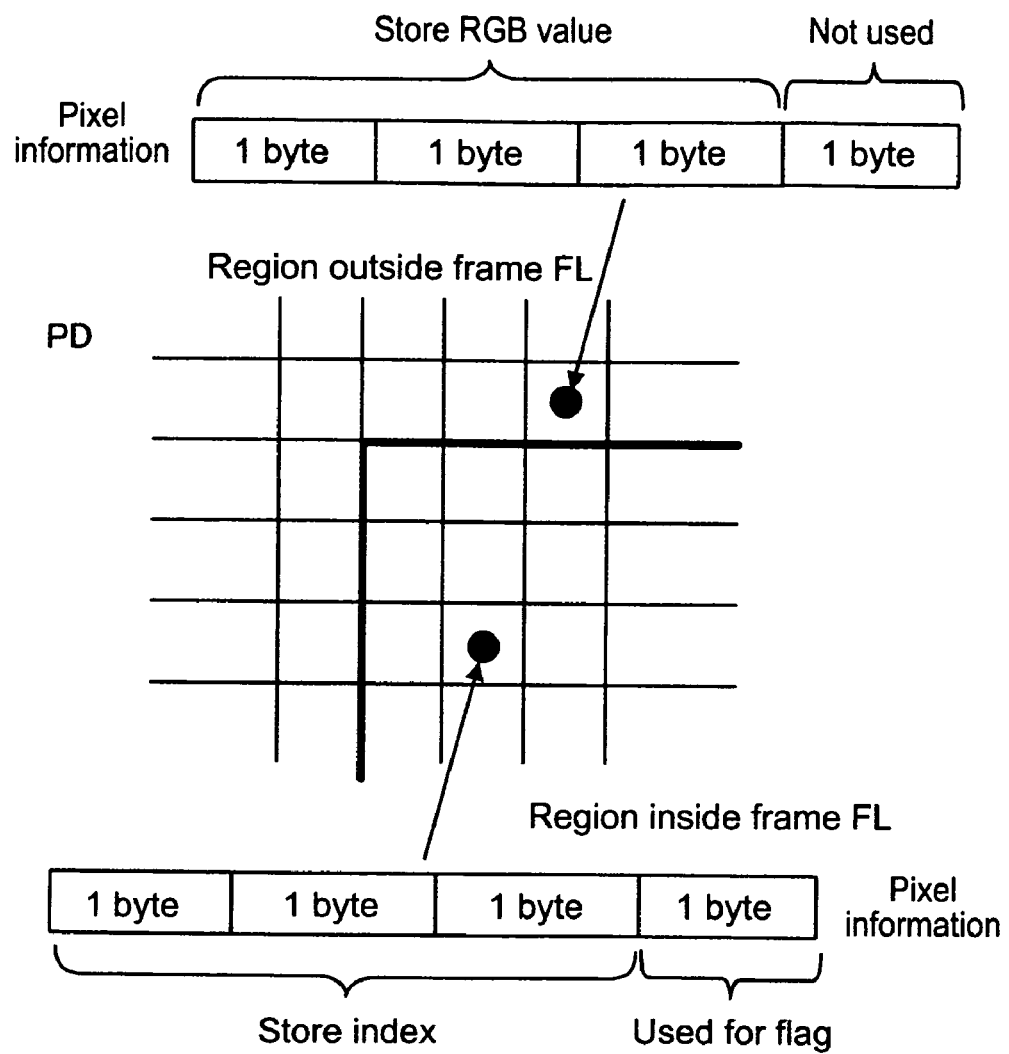
FIG. 7 shows print data.

FIG. 7 shows a schematic view of the composition of the print data PD. In FIG. 7, the print data PD is constituted by a plurality of pixels which are arranged in a dot matrix configuration, and each pixel has 4 bytes (8 bits×4) of information. The print data PD represents an image similar to the template area TP shown in FIG. 4, and the pixels other than the region corresponding to the frames FL1 to FL12 of the template TP (second pixels) have an RGB value of the color corresponding to the template area TP. The graduated tone values of the respective R G B channels are each represented by 8 bits (giving 256 graduated tones), and three of the four bytes are used to store the RGB values. For example, if the color of the template TP apart from the frames FL1 to FL12 is represented by a uniform intermediate gray having a value of (R, G, B) (128, 128, 128), then the pixels of the print data PD other than those of the region corresponding to the frames FL1 to FL12 have color information of (R, G, B)=(128, 128, 128). The remaining one byte is not used.

On the other hand, the pixels (first pixels) which correspond to the frames FL1 to FL12 of the template TP also have four bytes of information, and normally store an index using the three bytes which store the RGB values. This index is generated uniquely for each frame FL1 to FL12 at step S150, and the PDG P2c acquires an index from the RAM 12 and stores the index corresponding to the pixels which correspond to the frames FL1 to FL12. A flag indicating that an index has been stored is set using the remaining one byte, in respect of the pixels corresponding to the frames FL1 to FL12 which store an index instead of RGB values. By this means, it is possible to distinguish whether each pixel stores an RGB value or an index. In this embodiment, it is possible to use three bytes in order to store an index, and therefore at step S150 it is necessary to generate an index which can be expressed by an information volume of three bytes or less. If print data PD having a bitmap format can be generated as described above, then at step S180, the PDG P2c generates an index table IDB.

FIG. 8 shows one example of an index table IDB. In FIG. 8, display RGB values which correspond to the target color values for each light source and the target color value with a D65 light source as obtained by color measurement are stored respectively for each of the unique indices which have been generated to correspond to the frames FL1 to FL12. When the generation of the index table IDB has been completed, the print data PD is output to the PDV P3b via the GDI P1a and the spooler P1b. In terms of external form, the print data PD does not differ from a normal RGB bitmap and can therefore be processed similarly to a normal print job in the GDI P1a and the spooler P1b provided by the OSP 1. On the other hand, the index table IDB is output directly to the PDV P3b. In the embodiment, a new index table IDB is generated, but it is also possible to append a new association between an index, a target color value and a display RGB value, to an existing index table IDB. Furthermore, the print data generation process described above and the printing control process described below do not necessarily have to be executed in consecutive fashion in the same apparatus, and it is also possible for the print data generation process and the printing control process to be carried out independently in a plurality of computers which are connected via a communications circuit, such as a LAN or the Internet, for example.

3. PRINTING CONTROL PROCESS

Figure 9:
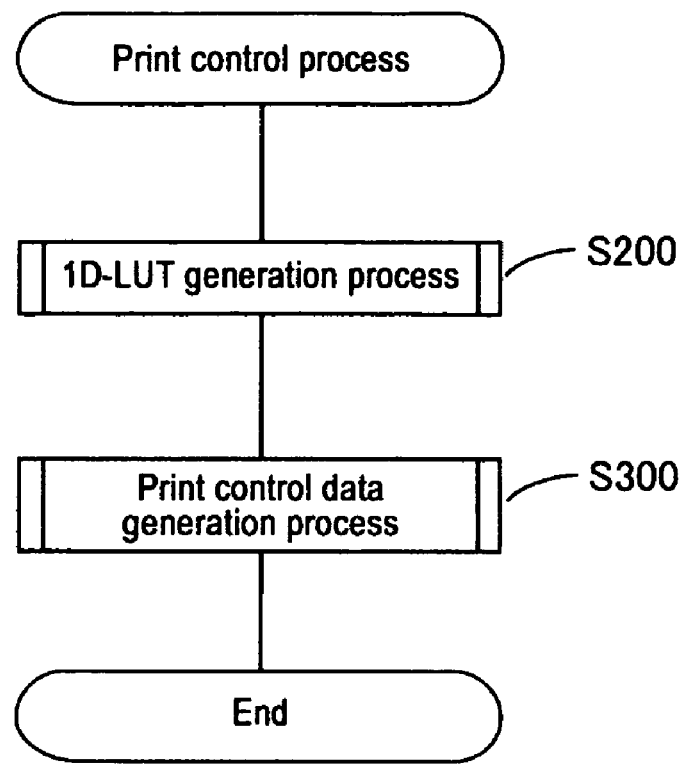
FIG. 9 shows a flowchart of the overall flow of a printing control process.

FIG. 9 shows the overall flow of a printing control process which is executed by the LUG P3a and the PDV P3b. The LUG P3a corresponds to the 1D-LUT generation process (step S200) and the PDV P3b corresponds to the other printing control data generation process (step S300). It is also possible for the 1D-LUT to be carried out before the printing control data generation process, and it is possible for the 1D-LUT and the printing control data generation process to be carried out in parallel.

3-1. 1D-LUT Generation Process

Figure 10:
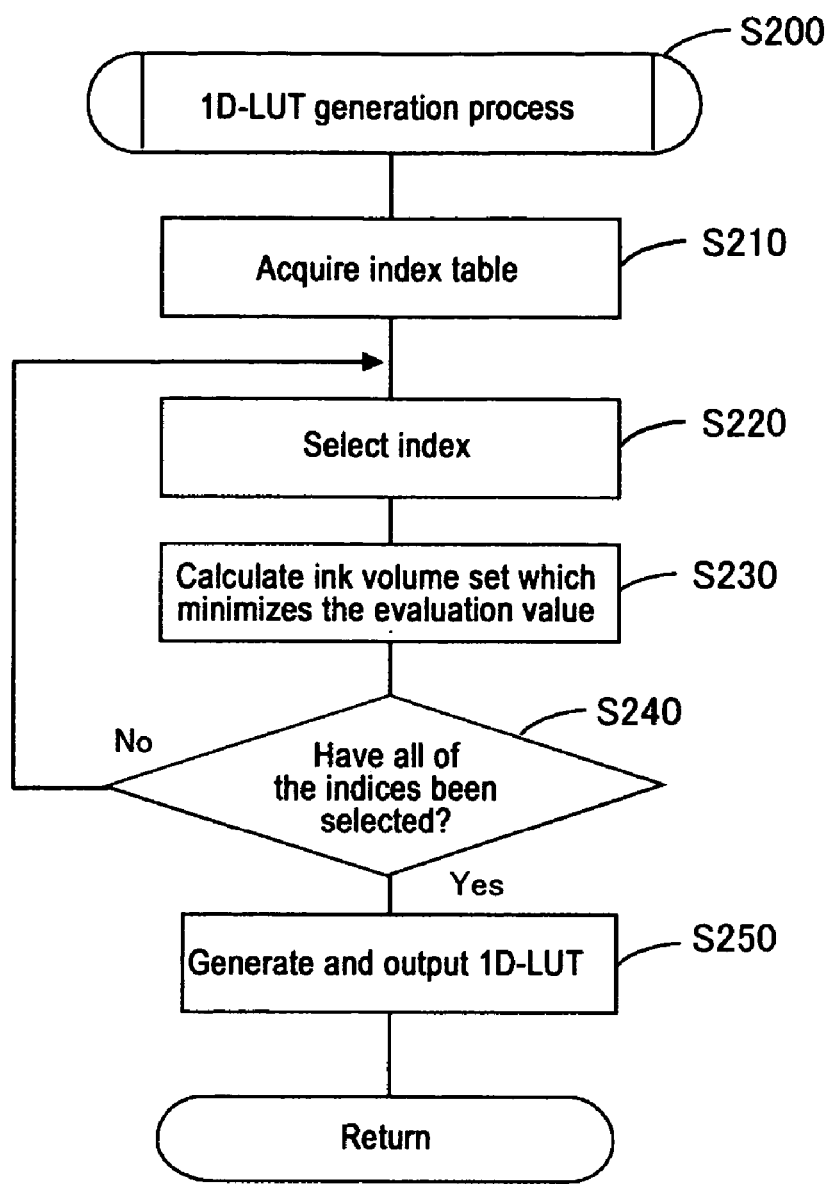
FIG. 10 shows a flowchart of the flow of a 1D-LUT generation process.

FIG. 10 shows the flow of 1D-LUT generation processing. As shown in FIG. 2, the LUG P3a is constituted by an ink volume set calculation module (ICM) P3a1, a spectral reflectivity prediction module (RPM) P3a2, a color calculation module (CCM) P3a3, an evaluation value calculation module (ECM) P3a4 and a LUT output module (LOM) P3a5. In step S210, the ICM P3a1 acquires the index table IDB. In step S220, one index is selected from the index table IDB and the calorimetric data MD associated with that index is acquired. In step S230, the ICM P3a1 carries out processing for calculating an ink volume set which allows reproduction of a color similar to the target color value indicated by the colorimetric data MD. The RPM P3a2, the CCM P3a3 and the ECM P3a4 are used in this processing.

Figure 11:
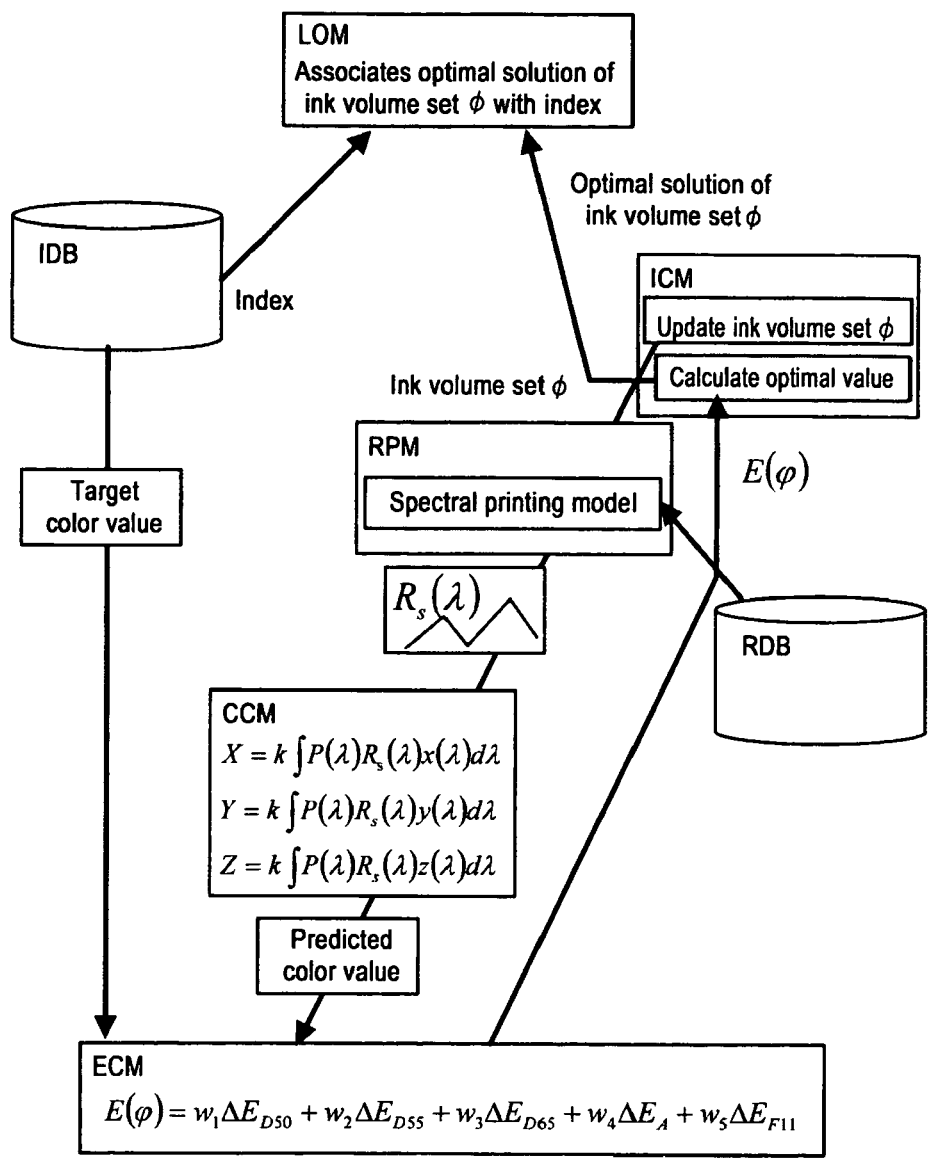
FIG. 11 shows a schematic view of the flow of a process for optimizing an ink volume set.

FIG. 11 shows a schematic view of the flow of processing for calculating an ink volume set which allows reproduction of a color similar to the target color value indicated by the calorimetric data MD. The RPM P3a2 predicts, as a predicted spectral reflectivity $R_s(\lambda)$, the spectral reflectivity $R(\lambda)$ when the printer 20 has ejected ink onto a prescribed printing paper on the basis of an ink volume set φ in response to the input of an ink volume set φ from the ICM P3a1, and outputs this predicted spectral reflectivity $R_s(\lambda)$ to the CCM P3a3. The printer 20 according to the embodiment is an inkjet printer and carries out printing by ejecting inks of the colors C (cyan), M (magenta), Y (yellow), K (black), lc (light cyan) and lm (light magenta), onto printing paper. The ink volume set φ means the combination of the respective ink volumes $d_c$, $d_M$, $d_Y$, $d_K$, $d_{lc}$ and $d_{lm}$ of the inks C, M, Y, K, lc, lm which are ejected. Since the state of formation of the respective ink dots on the printing paper can be predicted, provided that the ink volume set φ is specified, then the RPM P3a2 is able to calculate the predicted spectral reflectivity $R_s(\lambda)$ uniquely. The prediction model (spectral printing model) used by the RPM P3a2 is described in detail in section 4. below.

When the predicted spectral reflectivity $R_s(\lambda)$ has been obtained, the CCM P3a3 calculates predicted color values for cases where the five light sources described above are irradiated onto an object having this predicted spectral reflectivity $R_s(\lambda)$. Here, a L*a*b* value in a CIELAB color space is calculated as the predicted color value. The flow for calculating the predicted color value is similar to that indicated in FIG. 6 and the abovementioned Formula (1) (but the target spectral reflectivity $R_t(\lambda)$ is substituted with the predicted spectral reflectivity $R_s(\lambda)$). In other words, an L*a*b* value can be calculated as the predicted color value by multiplying the energy spectra of the respective light sources by the predicted spectral reflectivity $R_s(\lambda)$, convolving using an isochromatic function, and then converting the tristimulus value to an L*a*b* value. A predicted color value is calculated respectively for each of the five light sources and these predicted color values are output to the ECM P3a4.

The ECM P3a4 calculates the color difference ΔE between the target color value indicated by the colorimetric data MD and the predicted color value, for each of the light sources. In the embodiment, the color difference ΔE ($\Delta E_{2000}$) is calculated on the basis of the color difference formula according to CIE DE2000. Furthermore, the color differences for the respective light sources are denoted as $\Delta E_{D50}$, $\Delta E_{D55}$, $\Delta E_{D65}$, $\Delta E_A$ and $\Delta E_{F11}$. When the color differences for the light sources have been calculated as $\Delta E_{D50}$, $\Delta E_{D55}$, $\Delta E_{D65}$, $\Delta E_A$ and $\Delta E_{F11}$, then an evaluation value $E(\phi)$ is determined using Formula (2) below.

Expression 2

$$E(\phi)=w_1\Delta E_{D50}+w_2\Delta E_{D55}+w_3\Delta E_{D65}+w_4\Delta E_A+w_5\Delta E_{F11} \quad \Lambda(2)$$

In Formula (2), $w_1$ to $w_5$ are weighting coefficients which set weightings for the respective light sources, and in the embodiment, the weightings are made equal by setting the coefficients as follows: $w_1=w_2=w_3=w_4=w_5$. The evaluation value $E(\phi)$ is a value which decreases when the color differences of the respective light sources $\Delta E_{D50}$, $\Delta E_{D55}$, $\Delta E_{D65}$, $\Delta E_A$, $\Delta E_{F11}$ decrease, and hence assumes a lower value the smaller the overall difference between the target colorimetric value and the predicted color value for each of the light sources. The evaluation value $E(\phi)$ thus calculated is returned to the ICM P3a1. In other words, a composition is adopted in which the ICM P3a1 outputs a desired ink volume set $\phi$ to the RPM P3a2, the CCM P3a3 and the ECM P3a4, and in response an evaluation value $E(\phi)$ is returned finally to the ICM P3a1. By means of the ICM P3a1 repeatedly obtaining an evaluation value $E(\phi)$ in respect of the desired ink volume set $\phi$, an optimal solution for the ink volume set $\phi$ which minimizes the evaluation value $E(\phi)$ is calculated as an object function. For the method of calculating this optimal solution, it is possible to use a nonlinear optimization method, such as a gradient method, for example.

Figure 12:
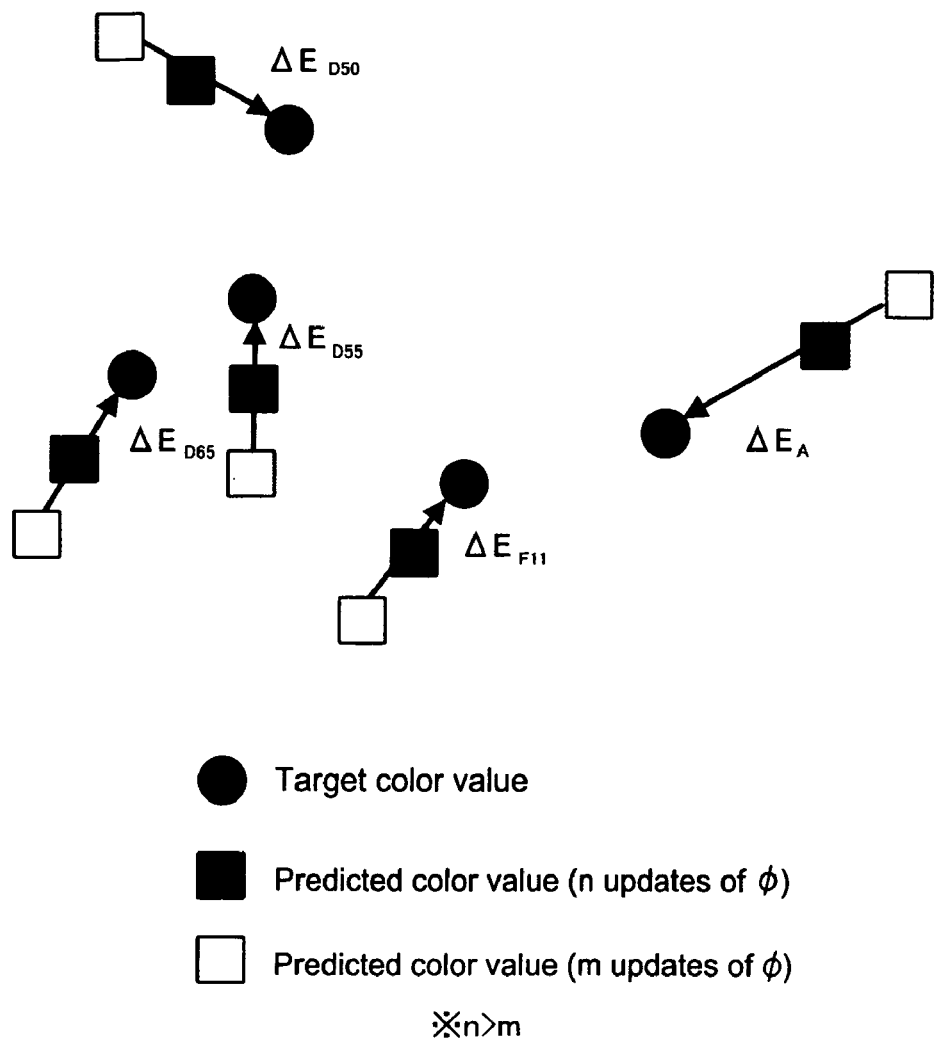
FIG. 12 shows a schematic view of a case where the ink volume set is progressively optimized.

FIG. 12 shows a schematic view of a situation where the ink volume set $\phi$ is successively optimized in step S230. FIG. 12 shows the changes in the CIELAB color space of the target color values indicated by the target TG under the respective light sources, and the predicted color values under the respective light sources when the ink volume set $\phi$ is optimized. According to Formula (2), it is possible to adopt as the optimized conditions a situation where the color differences for all of the light sources, $\Delta E_{D50}$, $\Delta E_{D55}$, $\Delta E_{D65}$, $\Delta E_A$, $\Delta E_{F11}$ are lowered together, and therefore the ink volume set $\phi$ is progressively optimized in such a manner that the color differences under the respective light sources, $\Delta E_{D50}$, $\Delta E_{D55}$, $\Delta E_{D65}$, $\Delta E_A$, $\Delta E_{F11}$, gradually decrease. By adopting this composition, it is possible to calculate the ink volume set $\phi$ which enables the printer 20 to reproduce a visual appearance that is similar to the target TG under any light source. The condition for the end of the optimization process may be set as a number of update repetitions of the ink volume set $\phi$ or a threshold value of the evaluation value $E(\phi)$.

When the ICM P3a1 has calculated an ink volume set $\phi$ which allows reproduction of a similar color to the target color value indicated by the colorimetric data MD at step S230, then at step S240, it is judged whether or not all of the indices stated in the index table IDB have been selected at step S220, and if they have not all been selected, then the procedure returns to step S220 and the next index is selected. In this way, it is possible to calculate an ink volume set $\phi$ which allows reproduction of a color similar to the target color value, for all of the indices. In other words, it is possible to calculate an ink volume set $\phi$ which allows reproduction of a color similar to the target color values indicated by the calorimetric data MD, for all of the targets TG1 to TG12 that have been subjected to color measurement at step S140 of the print data generation process (FIG. 2). If it is judged at step S240 that the optimal ink volume set $\phi$ has been calculated for all of the indices, then at step S250, the LOM P3a5 generates a 1D-LUT and this 1D-LUT is output to the PDV P3b.

FIG. 13 shows one example of the 1D-LUT. In FIG. 13, an optimal ink volume set $\phi$ is stored in respect of each of the indices. In other words, it is possible to prepare a 1D-LUT which states, for each of the targets TG1 to TG12, the ink volume set $\phi$ that allows a visual appearance similar to the respective target TG1 to TG12 to be reproduced by the printer 20. When the 1D-LUT is output to the PDV P3b, the 1D-LUT generation process ends and the next printing control data generation process (step S300) is executed.

3-2. Printing Control Data Generation Process

Figure 14:
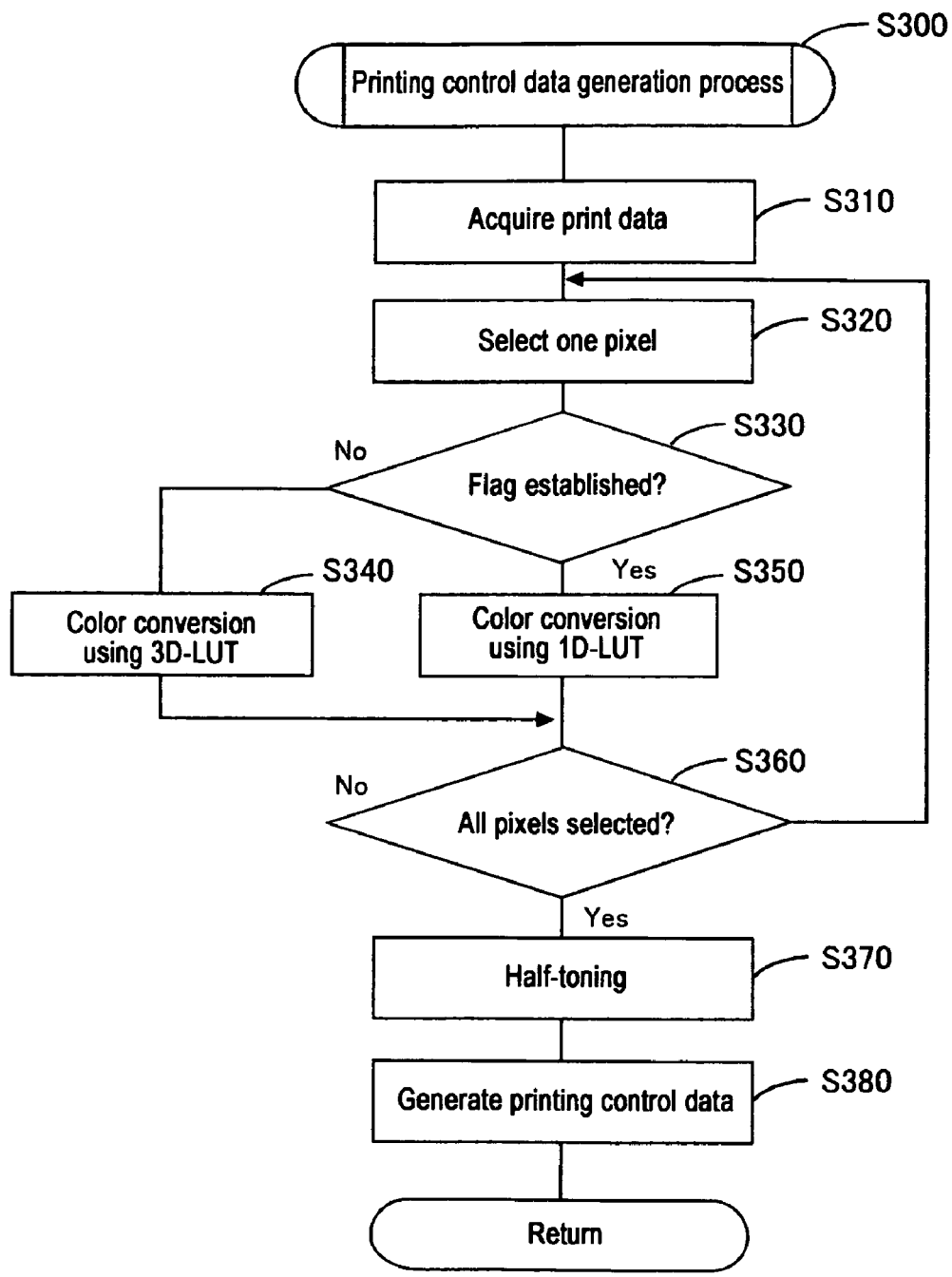
FIG. 14 shows a flowchart of the flow of a printing control data generation process.

FIG. 14 shows the flow of printing control data generation processing. As shown in FIG. 2, the PDV P3b is constituted by a mode identification module (MIM) P3b1, an index switching module (ISM) P3b2, an RGB switching module (CSM) P3b3, a halftone module (HTM) P3b4 and a rasterization module (RTM) P3b5. At step S310, the mode identification module (MIM) P3b1 acquires the print data PD. At step S320, the MIM P3b1 selects one pixel from the print data PD. At step S330, the MIM P3b1 judges whether or not a flag has been established to indicate that an index has been stored for the selected pixel. If it is judged that this flag has not been established, then at step S340 the CSM P3b3 refers to a 3D-LUT and carries out color conversion (color separation) for that pixel.

Figure 15:
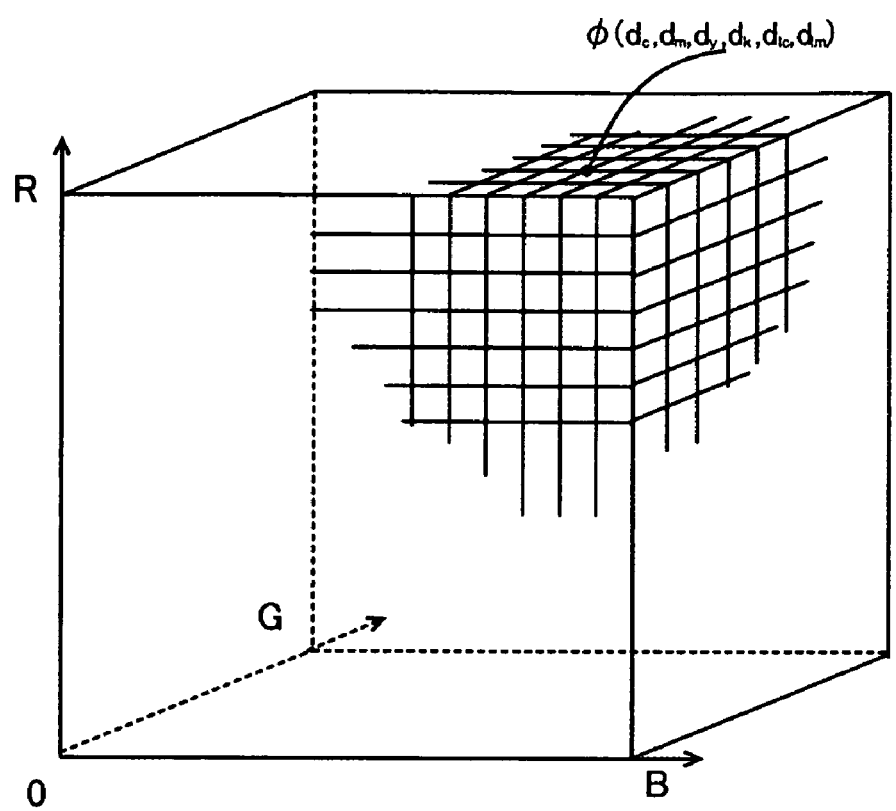
FIG. 15 shows a 3D-LUT.

FIG. 15 shows one example of the 3D-LUT. In FIG. 15, the 3D-LUT is a table which states an association between an RGB value and an ink volume set $\phi$ ($d_c$, $d_M$, $d_Y$, $d_K$, $d_{lc}$, $d_{lm}$) for each of a plurality of representative coordinates in the color space, and the CSM P3b3 acquires an ink volume set $\phi$ corresponding to the RGB value of the pixel in question, by referring to the 3D-LUT. In the case of an RGB value which is not stated directly in the 3D-LUT, the corresponding ink volume set $\phi$ is acquired by interpolation. The method of creating the 3D-LUT may employ that described in JP-A-2006-82460, or the like. JP-A-2006-82460 describes the creation of a 3D-LUT which achieves good characteristics overall in terms of the color reproducibility with a specific light source, the tonal graduations of the reproduced colors, the granularity, the independence of the reproduced colors with respect to the light source, the gamut, and the ink duty.

On the other hand, if it is judged at step S330 that a flag has been established to indicate that an index has been stored for the selected pixel, then at step S350, the ISM P3b2 refers to the 1D-LUT and performs color conversion (color separation) for that pixel. In other words, an index is acquired from a pixel for which a flag has been established to indicate that an index has been stored, and furthermore an ink volume set $\phi$ which is associated with that index in the 1D-LUT is acquired. When an ink volume set φ has been acquired successfully for the pixel at either step S340 or step S350, then at step S360 it is judged whether or not it has been possible to acquire an ink volume set φ for all of the pixels. If there are remaining any pixels for which the ink volume set φ has not been acquired, then the procedure returns to step S320 and the next pixel is selected.

By repeating the processing described above, it is possible to acquire an ink volume set φ for all of the pixels. When an ink volume set φ has been acquired for all of the pixels, then all of the pixels will have been converted to print data PD in which the pixels are represented by an ink volume set φ. By judging which of the 1D-LUT and the 3D-LUT to use for each of the pixels, it is possible to acquire ink volume sets φ which allow reproduction of colors that are close to the respective targets TG1 to TG12 under the respective light sources, for the pixels corresponding to the frames F1 to F12 which store an index, as well as being able to acquire ink volume sets φ which allow reproduction of colors based on the basic principle of the 3D-LUT (which, for instance, prioritizes granularity) in respect of the pixels which store an RGB value.

At step S370, the HTM P3b4 acquires the print data PD in which the pixels are represented by ink volume sets φ and carries out halftone processing. The HTM P3b4 can use a commonly known dithering method, error diffusion method, or the like, for the halftone processing. When the halftone processing has been completed, each pixel in the print data PD has an ejection signal which indicates whether or not to eject the respective inks. At step S380, the RTM P3b5 acquires the print data PD which has completed halftone processing, and carries out processing for allocating the ejection signals in the print data PD to the respective scanning paths and nozzles of the print head of the printer 20. By this means, it is possible to generate printing control data CD which can be output to the printer 20; the print data control CD appended with a necessary control signal for the printer 20 is output to the spooler P1b and the printer 20. Accordingly, the printer 20 ejects ink onto the printing paper and creates a sample chart SC.

In this manner, it is possible to reproduce the colors of the respective targets TG1 to TG12 in the region corresponding to the frames FL1 to FL12 of the sample chart SC formed on the printing paper. Moreover, since the region corresponding to the frames FL1 to FL12 is printed using ink volume sets φ which comply with the target color values of the targets TG1 to TG12 under the plurality of light sources, then it is possible to reproduce colors which are similar to the targets TG1 to TG12 under the respective light sources. In other words, the colors of the region corresponding to the frames FL1 to FL12 when the sample chart SC is observed indoors are able to reproduce the colors viewed when the targets TG1 to TG12 are observed indoors, and the colors of the region corresponding to the frames FL1 to FL12 when the sample chart SC is observed outdoors are able to reproduce the colors viewed when the targets TG1 to TG12 are observed outdoors. In other words, it is possible to create a sample chart SC which is not dependent on the observation light source.

Ultimately, if a sample chart SC having exactly the same spectral reflectivities R(λ) as the targets TG1 to TG12 is reproduced, then similar colors to the targets TG1 to TG12 can be reproduced with any of the light sources. However, since the inks (types of coloring material) which can be used by the printer 20 are limited to C, M, Y, K, lc and lm, then it is not possible in practice to determine ink volume sets φ which allow reproduction of exactly the same spectral reflectivities R(λ) as the targets TG1 to TG12. Furthermore, even if ink volume sets φ which allow reproduction of spectral reflectivities R(λ) similar to the targets TG1 to TG12 are determined for wavelengths which do not affect color perception, this will be of no use in achieving accurate visual reproduction. In the invention, by contrast, ink volume sets φ which allow reproduction of target color values under a plurality of practicable light sources are determined and hence satisfactory accuracy in visual terms can be achieved while relaxing the optimization conditions applied to the ink volume sets φ.

On the other hand, in the region which corresponds to the frames FL1 to FL12 of the sample chart SC formed on the printing paper, printing is carried out using ink volume sets φ which are based on the 3D-LUT. Therefore, the printing performance in this region is based on the 3D-LUT. As stated previously, in the embodiment, the region other than the frames FL1 to FL12 shows a uniform intermediate gray image, and in this region, the 3D-LUT is able to satisfy the intended print performance. In other words, it is possible to achieve printing which satisfies good characteristics overall in terms of the tonal graduations of the reproduced colors, the granularity, the independence of the reproduced colors with respect to the light source, the gamut, and the ink duty.

4. SPECTRAL PRINTING MODEL

Figure 16:
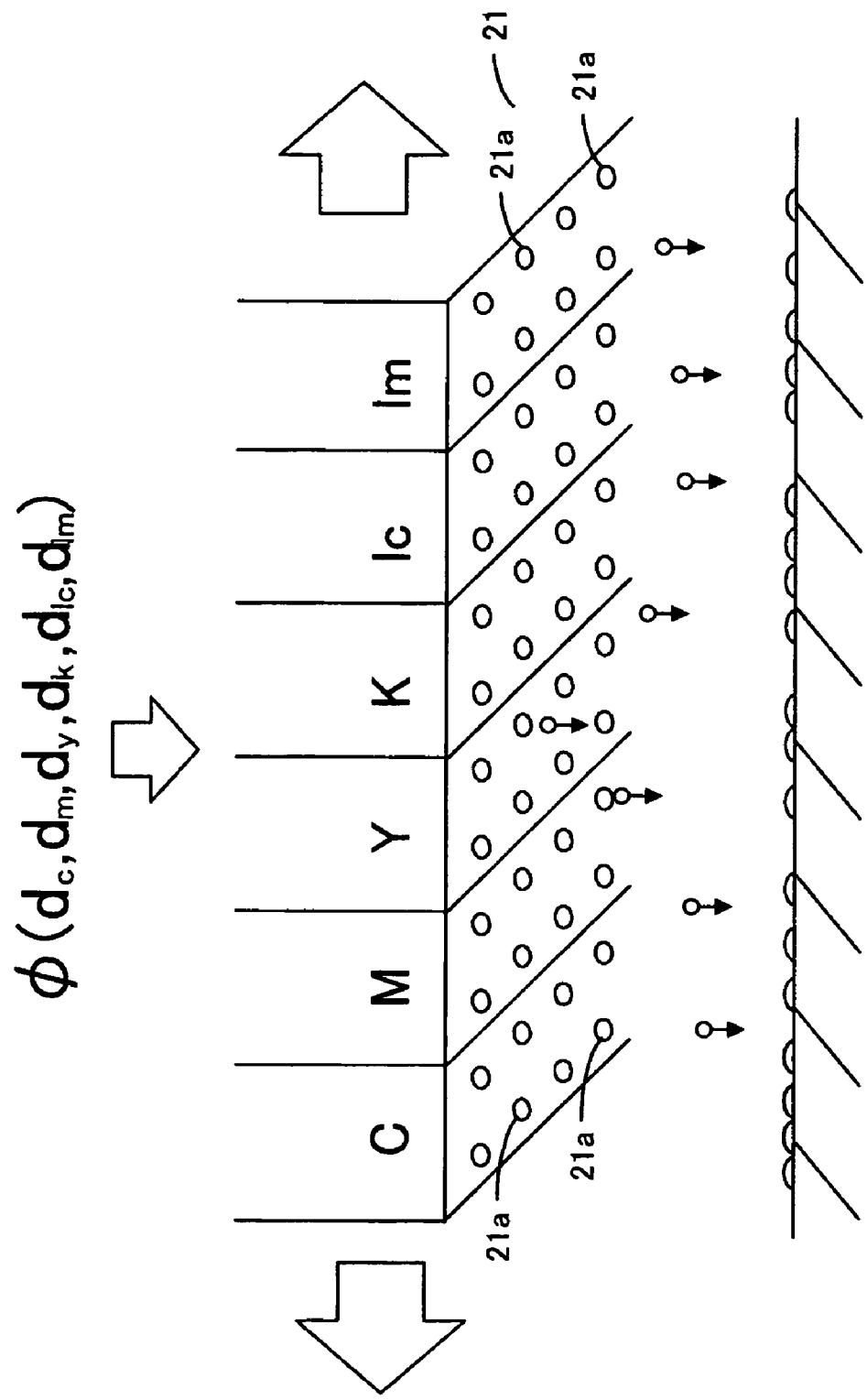
FIG. 16 shows a schematic view of the printing system of a printer.

FIG. 16 shows a schematic view of the printing method of the printer 20 according to the embodiment. In FIG. 16, the printer 20 has a print head 21 equipped with a plurality of nozzles 21a, 21a, . . . , and so on, for each of the inks of colors C, M, Y, K, lc, lm; the ink volumes of the respective inks, C, M, Y, K, lc, lm, ejected by the nozzles 21a, 21a, . . . , are controlled on the basis of the printing control data CD to volumes which comply with the ink volume set φ ($d_c$, $d_m$, $d_y$, $d_k$, $d_{lc}$, $d_{lm}$). The ink droplets ejected by the nozzles 21a, 21a, . . . , form very fine dots on the printing paper, and a print image having an ink area coverage corresponding to the ink volume set φ ($d_c$, $d_m$, $d_y$, $d_k$, $d_{lc}$, $d_{lm}$) is formed on the printing paper by a collection of a plurality of dots.

The prediction model (spectral printing model) used by the RPM P3a2 is a prediction model for predicting, as the predicted spectral reflectivity $R_s(\lambda)$, the spectral reflectivity R(λ) in a case where printing is carried out using any desired ink volume set φ ($d_c$, $d_m$, $d_y$, $d_k$, $d_{lc}$, $d_{lm}$) which can be used by the printer 20 according to the embodiment. In the spectral printing model, in practice, color patches are printed in respect of a plurality of representative points in an ink volume space, and a spectral reflectivity database DB is drawn up by measuring the spectral reflectivity R(λ) of the patches using a spectral reflectometer. By using this spectral reflectivity database DB to carry out prediction in a Cellular Yule-Nielsen Spectral Neugebauer Model, an accurate predicted spectral reflectivity $R_s(\lambda)$ is derived for a case where printing is carried out using the desired ink volume set φ ($d_c$, $d_m$, $d_y$, $d_k$, $d_{lc}$, $d_{lm}$).

FIG. 17 shows a spectral reflectivity database DB. As shown in FIG. 17, the spectral reflectivity database DB is a look-up table which states a spectral reflectivity R(λ) actually obtained by printing and measurement, for ink volume sets ($d_c$, $d_m$, $d_y$, $d_k$, $d_{lc}$, $d_{lm}$) at a plurality of grid points in the ink volume space (in the embodiment, a six-dimensional space, but only the CM plane is shown in FIG. 17 in order to simplify the illustration). For example, grid points are generated on the 5 grids which divide up the respective ink volume axes. Here, as many as $5^{13}$ grid points are generated, which would require the printing and measurement of a huge volume of color patches, but in practice, there are limitations on the number of inks which can be loaded simultaneously in the printer 20 and the ink duties which can be ejected simultaneously, and therefore the number of grid points which are printed and measured is restricted.

Moreover, it is possible to reduce the number of color patches which are actually printed and measured by carrying out printing and measurement only for a portion of the grid points, and then predicting spectral reflectivities R(λ) in relation to the other grid points on the basis of the spectral reflectivities R(λ) of the grid points which have actually been printed and measured. The spectral reflectivity database DB must be prepared for each printing paper which can be used with the printer 20. Strictly speaking, this is because the spectral reflectivity R(λ) is governed by the spectral transmittance resulting from the ink film (dots) formed on the printing paper and the reflectivity of the printing paper, and therefore is greatly influenced by the surface properties of the printing paper (which affects the dot shape) and the reflectivity of the printing paper. Next, the prediction process based on a Cellular Yule-Nielsen Spectral Neugebauer Model using the spectral reflectivity database DB will be described.

The RPM P3a2 carries out prediction based on a Cellular Yule-Nielsen Spectral Neugebauer Model using the spectral reflectivity database DB in response to a request from the ICM P3a1. In this prediction process, prediction conditions are acquired from the ICM P3a1 and set. More specifically, the printing paper and the ink volume set φ are set as printing conditions. For example, if prediction is made for glossy paper as the printing paper, then a spectral reflectivity database DB created by printing color patches on a glossy paper is set.

When the spectral reflectivity database DB has been set, the ink volume set φ ($d_c$, $d_m$, $d_y$, $d_k$, $d_{lc}$, $d_{lm}$) input from the ICM P3a1 is used in the spectral printing model. The Cellular Yule-Nielsen Spectral Neugebauer Model is based on the commonly known Spectral Neugebauer Model and the Yule-Nielsen Model. In order to simplify the explanation, the following description relates to a model where three types of ink, C, M and Y, are used, but a similar model can easily be expanded to a model using a desired ink set including the inks C, M, Y, K, lc, lm, of the embodiment. Furthermore, for information on the Cellular Yule-Nielsen Spectral Neugebauer Model, refer to Color Res. Appl. 25, 4-19, 2000 and R. Balasubramanian, Optimization of the spectral Neugebauer model for printer characterization, J. Electronic Imaging 8(2), 156-166 (1999).

Figure 18:
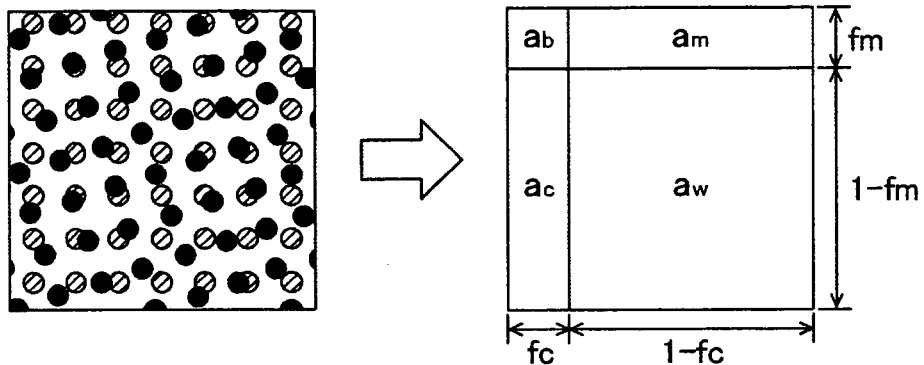
FIG. 18 shows a Spectral Neugebauer Model.
Figure 18:
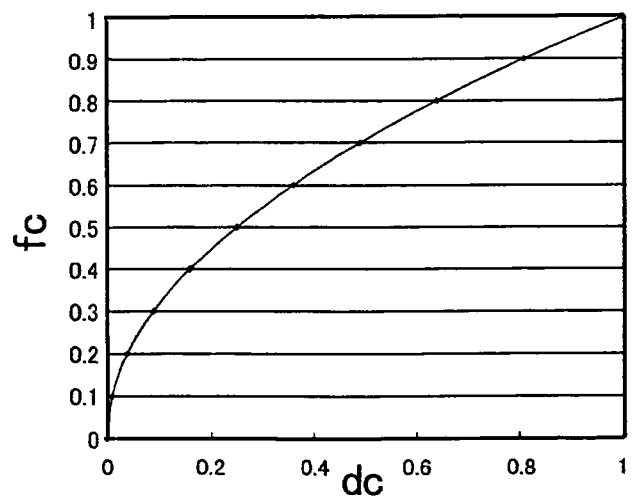

FIG. 18 shows a Spectral Neugebauer Model. In the Spectral Neugebauer Model, the predicted spectral reflectivity $R_s(\lambda)$ of the printed object when printed using a desired ink volume set ($d_c$, $d_m$, $d_y$) is given by Formula (3) below.

Expression 3

$$R_s(\lambda) = a_w R_w(\lambda) + a_c R_c(\lambda) + a_m R_m(\lambda) + a_y R_y(\lambda) + a_r R_r(\lambda) + \quad \Lambda \text{ (3)}$$
$$a_g R_g(\lambda) + a_g R_g(\lambda) + a_b R_b(\lambda) + a_k R_k(\lambda)$$
$$a_w = (1 - f_c)(1 - f_m)(1 - f_y)$$
$$a_c = f_c(1 - f_m)(1 - f_y)$$
$$a_m = (1 - f_c)f_m(1 - f_y)$$
$$a_y = (1 - f_c)(1 - f_m)f_y$$
$$a_r = (1 - f_c)f_m f_y$$
$$a_g = f_c(1 - f_m)f_y$$
$$a_b = f_c f_m(1 - f_y)$$
$$a_k = f_c f_m f_y$$

Here, $a_i$ is the surface area ratio of the ith region, and $R_i(\lambda)$ is the spectral reflectivity of the ith region. The suffix respectively refers to: a region where there is no ink (w); a region of cyan ink only (c); a region of magenta ink only (m); a region of yellow ink only (y); a region where magenta ink and yellow ink are ejected (r); a region where yellow ink and cyan ink are ejected (g); a region where cyan ink and magenta ink are ejected (b); and a region where the three inks, cyan, magenta and yellow, are ejected (k). Furthermore, $f_c$, $f_m$, $f_y$ are the surface area ratios (also called the "ink area coverage") which are covered by the respective inks of C, M and Y when only one type of ink is ejected.

The ink area coverage values $f_c$, $f_m$, $f_y$ are given by the Murray-Davis model which is shown in FIG. 18B. In the Murray-Davis model, the ink area coverage $f_c$ of the cyan ink, for example, is a nonlinear function of the cyan ink volume $d_c$, and the ink volume $d_c$ can be converted to an ink area coverage $f_c$ by means of a one-dimensional look-up table, for instance. The reason that the ink area coverage values $f_c$, $f_m$, $f_y$ are nonlinear functions of the ink volumes $d_c$, $d_m$, $d_y$ is because when a small volume of ink is ejected onto a unit surface area, the ink spreads significantly, but when a large amount of ink is ejected, the ink overlaps mutually and the surface area covered by the ink does not increase to a great extent. The same applies to the other inks, magenta and yellow.

If a Yule-Nielsen Model relating to spectral reflectivity is used, then Formula (3) is substituted with Formula (4a) or Formula (4b) below.

Expression 4

$$R_s(\lambda)^{1/n} = a_w R_w(\lambda)^{1/n} + a_c R_c(\lambda)^{1/n} + a_m R_m(\lambda)^{1/n} + \quad \Lambda \text{ (4a)}$$
$$a_y R_y(\lambda)^{1/n} + a_r R_r(\lambda)^{1/n} + a_g R_g(\lambda)^{1/n} +$$
$$a_b R_b(\lambda)^{1/n} + a_k R_k(\lambda)^{1/n}$$

$$R_s(\lambda) = \left\{ \begin{array}{c} a_w R_w(\lambda)^{1/n} + a_c R_c(\lambda)^{1/n} + a_m R_m(\lambda)^{1/n} + \\ a_y R_y(\lambda)^{1/n} + a_r R_r(\lambda)^{1/n} + a_g R_g(\lambda)^{1/n} + \\ a_b R_b(\lambda)^{1/n} + a_k R_k(\lambda)^{1/n} \end{array} \right\}^n \quad \Lambda \text{ (4b)}$$

Here, n is a prescribed coefficient equal to or greater than 1, and can be set to a value of n=10, for example. Formula (4a) and Formula (4b) are formulas which express the Yule-Nielsen Spectral Neugebauer Model.

The Cellular Yule-Nielsen Spectral Neugebauer Model used in the embodiment divides the ink volume space of the Yule-Nielsen Spectral Neugebauer Model described above into a plurality of cells.

Figure 19:
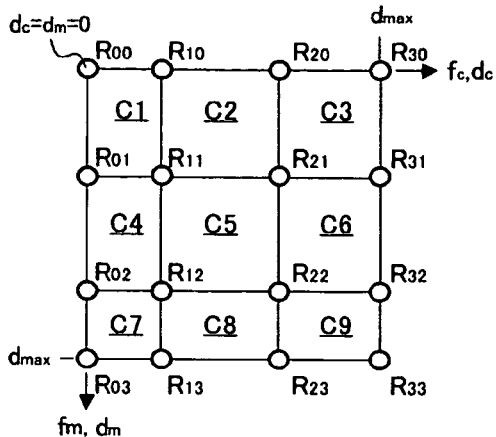
FIG. 19 shows a Cellular Yule-Nielsen Spectral Neugebauer Model.
Figure 19:
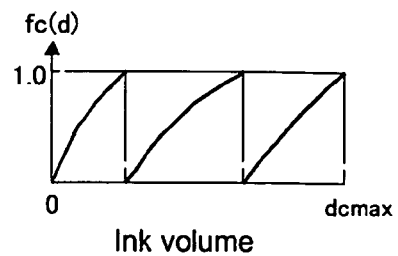
Figure 19:
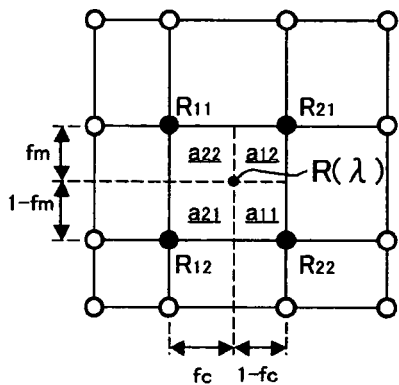

FIG. 19A shows an example of cell division in a Cellular Yule-Nielsen Spectral Neugebauer Model. Here, in order to simplify the description, cell division in depicted in a two-dimensional ink volume space which includes two axes, the ink volumes $d_c$ and $d_m$ of the C and M inks. In the Murray-Davis model, the ink area coverage values $f_c$ and $f_m$ have a unique relationship with the ink volumes $d_c$ and $d_m$ and therefore the axes can be considered as axes representing the ink area coverage values $f_c$ and $f_m$. The white circles are the grid points of the cell divisions, and the two-dimensional ink volume (area coverage) space is split into nine cells C1 to C9. The ink volume set ($d_c$, $d_m$) corresponding to each grid point is taken as the ink volume set corresponding to the grid point specified on the spectral reflectivity database DB. In other words, by referring to the above-referenced spectral reflectivity database DB, it is possible to obtain the spectral reflectivities R(λ) of each grid point. Consequently, the spectral reflectivities of the respective grid points, $R(\lambda)_{00}$, $R(\lambda)_{10}$, $R(\lambda)_{20}, \ldots, R(\lambda)_{33}$, can be acquired from the spectral reflectivity database DB.

In actual practice, in the embodiment, the cells are divided in a six-dimensional ink volume space of C, M, Y, K, lc, lm, and furthermore, the coordinates of the grid points are also expressed by a six-dimensional ink volume set $\phi$ ($d_c$, $d_m$, $d_y$, $d_k$, $d_{lc}$, $d_{lm}$). Therefore, the spectral reflectivity $R(\lambda)$ of the grid point corresponding to the ink volume set $\phi$ ($d_c$, $d_m$, $d_y$, $d_k$, $d_{lc}$, $d_{lm}$) is acquired from the spectral reflectivity database DB (for example, for a glossy paper).

FIG. 19B shows the relationship between the ink area coverage $f_c$ and the ink volume $d_c$ used in the cellular model. Here, the range 0 to $d_{cmax}$ of the ink volume for one type of ink is divided into three sectors and the virtual ink area coverage $f_c$ used in the cellular model is determined from the nonlinear curve which increases steadily from 0 to 1 in each sector. The ink area coverage $f_m$, $f_y$ is also determined in a similar fashion for the other inks.

FIG. 19C shows a method of calculating the predicted spectral reflectivity $R_s(\lambda)$ in a case where printing is carried out using any desired ink volume set ($d_c$, $d_m$) within cell C5, which is located in the center of FIG. 19A. The predicted spectral reflectivity $R_s(\lambda)$ when printing with the ink volume set ($d_c$, $d_m$) is given by Formula (5) below.

Expression 5

$$R_s(\lambda) = \left(\sum a_i R_i(\lambda)^{1/n}\right)^n \quad \Lambda \ (5)$$

$$= \begin{pmatrix} a_{11} R_{11}(\lambda)^{1/n} + a_{12} R_{12}(\lambda)^{1/n} + \\ a_{21} R_{21}(\lambda)^{1/n} + a_{22} R_{22}(\lambda)^{1/n} \end{pmatrix}^n$$

$$a_{11} = (1 - f_c)(1 - f_m)$$
$$a_{12} = (1 - f_c) f_m$$
$$a_{21} = f_c (1 - f_m)$$
$$a_{22} = f_c f_m$$

Here, the ink area coverage values $f_c$, $f_m$ in Formula (5) are values given by the graph in FIG. 19B. Furthermore, the spectral reflectivities $R(\lambda)_{11}$, $(\lambda)_{12}$, $(\lambda)_{21}$, $(\lambda)_{22}$, corresponding to the four grid points which surround the cell C5 can be acquired by referring to the spectral reflectivity database DB. By this means, it is possible to establish all of the values which make up the right-hand side of Formula (5), and from the calculation result of this formula, it is possible to derive the predicted spectral reflectivity $R_s(\lambda)$ when printing with a desired ink volume set $\phi$ ($d_c$, $d_m$). By successively shifting the wavelength $\lambda$ toward visible wavelengths, it is possible to obtain a predicted spectral reflectivity $R_s(\lambda)$ for the visible wavelength region. By dividing the ink volume space into a plurality of cells, it is possible to calculate the predicted spectral reflectivity $R_s(\lambda)$ more accurately compared to a case where the space is not divided. When the RPM P3a2 has predicted the predicted spectral reflectivity $R_s(\lambda)$ in response to a request from the ICM P3a1 as described above, the CCM P3a3 can then proceed to use this predicted spectral reflectivity $R(\lambda)$ to predict the predicted color values.

5. MODIFICATION EXAMPLES

5-1. Modification Example 1

In Formula (2), the weighting coefficients for the light sources $w_1$ to $w_5$ are set to equal values, but it is also possible to the weighting coefficients $w_1$ to $w_5$ to different values. If the weighting coefficients $w_1$ to $w_5$ are set to larger values, then it is possible to raise the degree to which the color differences $\Delta E_{D50}$, $\Delta E_{D55}$, $\Delta E_{D65}$, $\Delta E_A$, $\Delta E_{F11}$ of the corresponding light sources contribute to the increase in the evaluation value $E(\phi)$. Consequently, in order to minimize the evaluation value $E(\phi)$, it is necessary to ensure a particularly small value for the color differences $\Delta E_{D50}$, $\Delta E_{D55}$, $\Delta E_{D65}$, $\Delta E_A$, $\Delta E_{F11}$ for those light sources which have been set to a high weighting coefficient $w_1$ to $w_5$, and by using an ink volume set $\phi$ which has been optimized on the basis of this evaluation value $E(\phi)$, it is possible to achieve printing which reduces the color differences $\Delta E_{D50}$, $\Delta E_{D55}$, $\Delta E_{D65}$, $\Delta E_A$, $\Delta E_{F11}$ for the light sources which are set to a high weighting coefficient $w_1$ to $w_5$.

For example, the weighting coefficients $w_1$ to $w_5$ can be specified by the user. It is also possible for the user to specify respective weighting coefficients $w_1$ to $w_5$ in accordance with the respective importance of the D50 light source, the D55 light source, the D65 light source, the A light source, and the F11 light source. For example, if the user wishes to prioritize the reproduction accuracy of the colors under outdoor conditions, then the weighting coefficients $w_4$ and $w_5$ of the A light source and F11 light source should be set to small values. Of course, it is also possible to set a previously established combination of weighting coefficients $w_1$ to $w_5$ indirectly, by selecting a condition such as the environment in which the printed object is to be observed. By this means, it is possible to set suitable weighting coefficients $w_1$ to $w_5$ even in cases where the user has no knowledge of the light sources.

5-2. Modification Example 2

In the embodiment described above, the target color values of the target TG under the plurality of light sources are specified by means of a calorimeter 30, but it is also possible for the user to specify the target color values directly via the keyboard 50a, or the like. For example, if color value data obtained by previous color measurement of the target TG has already been prepared, or the like, then it is possible to specify the target color values by inputting this data. Moreover, since the target color values under the plurality of light sources can be calculated uniquely on the basis of the spectral reflectivity $R(\lambda)$ of the target TG, then it is also possible to measure the spectral reflectivity $R(\lambda)$ of the target TG by means of a spectral reflectometer instead of color measurement by a colorimeter 30 at step S140.

Figure 20:
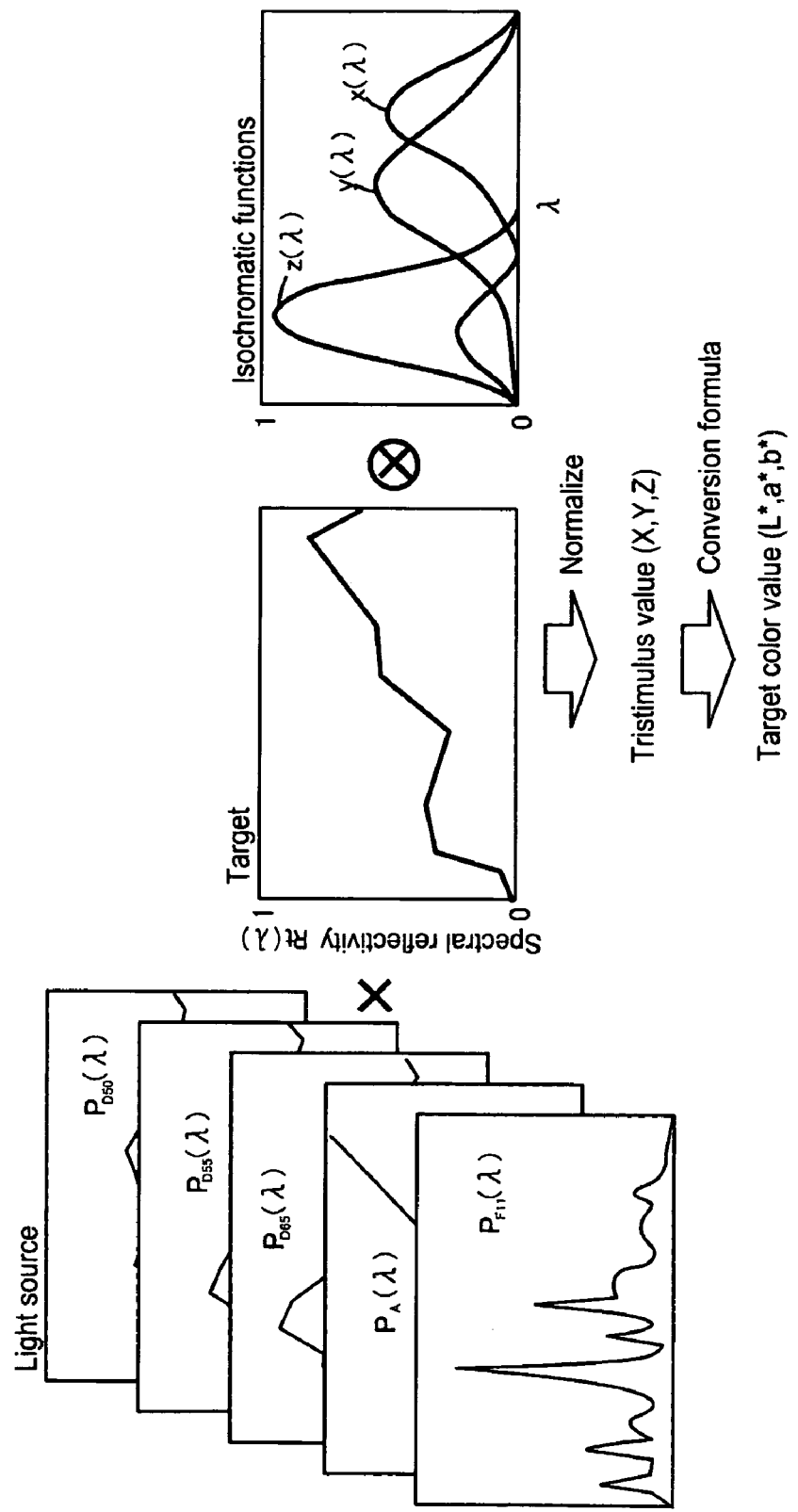
FIG. 20 shows a schematic view describing predicted color values relating to a modification example.

FIG. 20 shows a schematic view of the procedure for calculating the target color values in a case where the spectral reflectivity $R(\lambda)$ of the target TG is measured. FIG. 20 shows the spectral energies, $P_{D50}(\lambda)$, $P_{D55}(\lambda)$, $P_{D65}(\lambda)$, $P_A(\lambda)$, $P_{F11}(\lambda)$, of the five respective light sources (the standard daylight sources, the D50 light source, D55 light source and D65 light source, the incandescent light source A, and the fluorescent light source F11). In the embodiment, a spectral reflectivity $R(\lambda)$ is measured as the target spectral reflectivity $R_t(\lambda)$ for respective targets TG1 to TG12, and target color values are calculated by introducing this target spectral reflectivity $R_t(\lambda)$ and the spectral energies of the respective light sources, $P_{D50}(\lambda)$, $P_{D55}(\lambda)$, $P_{D65}(\lambda)$, $P_A(\lambda)$, $P_{F11}(\lambda)$, into Formula (1). It is possible to carry out similar processing as that of the embodiment described above, in respect of the target color values obtained in this way.

5-3. Modification Example 3

Figure 21:
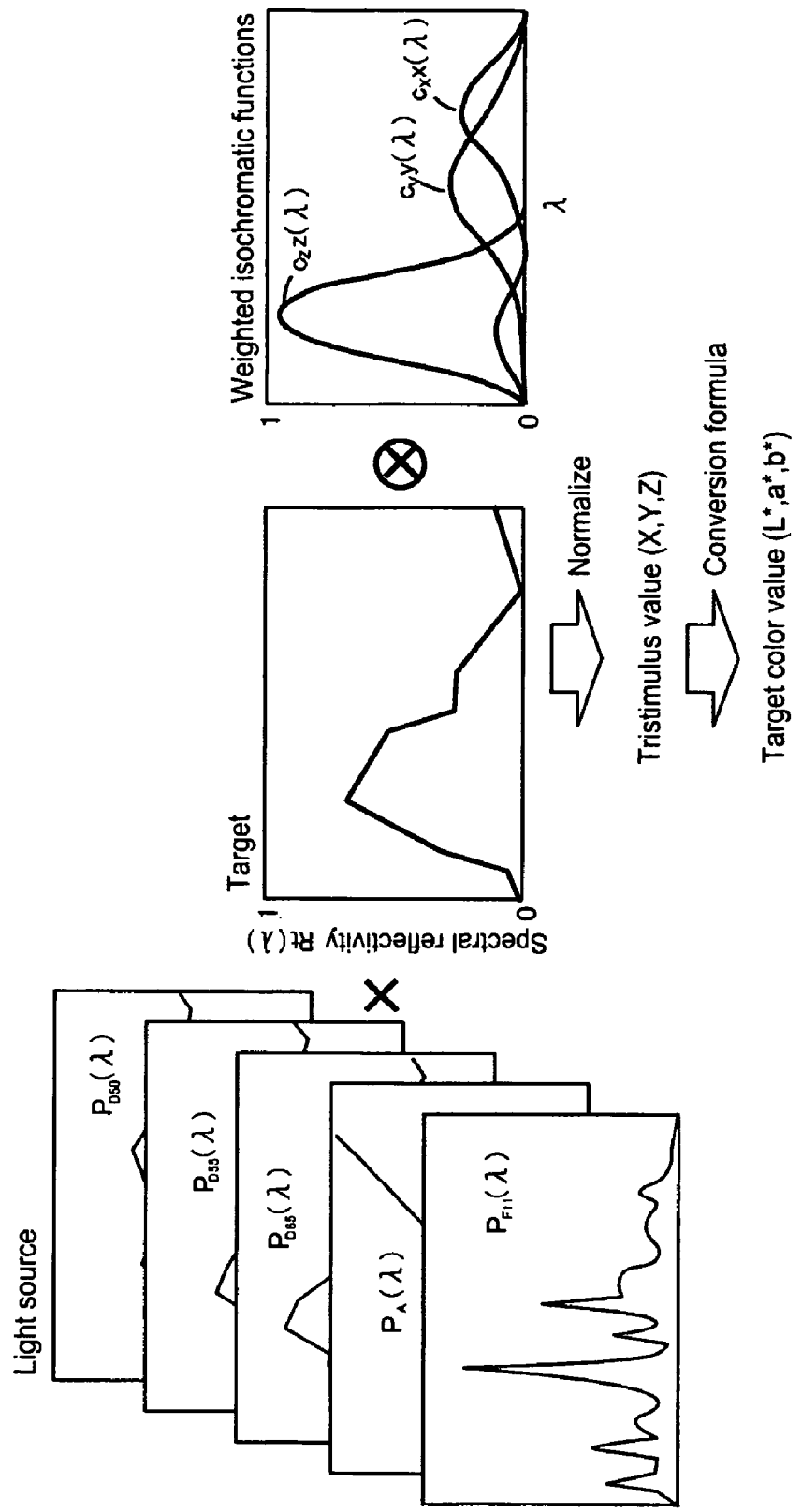
FIG. 21 shows a schematic view of weighting coefficients relating to a modification example.

FIG. 21 shows a schematic view of a case where the CCM P3a3 calculates predicted color values on the basis of the predicted spectral reflectivity $R_s(\lambda)$ in a modification example. FIG. 21 shows the target spectral reflectivity $R_t(\lambda)$ obtained in the modification example described above, and the correlation coefficients $c_x$, $c_y$, $c_z$ between this target spectral reflectivity $R_t(\lambda)$ and the respective isochromatic functions $x(\lambda)$, $y(\lambda)$, $z(\lambda)$ are calculated by the CCM P3a3. Since the isochromatic functions $x(\lambda)$, $y(\lambda)$, $z(\lambda)$ respectively assume large values in different wavebands, then it can be considered that the correlation coefficients $c_x$, $c_y$, $c_z$ will become high when the waveband where the isochromatic function assumes a large value is similar to the target spectral reflectivity $R_t(\lambda)$. The predicted color value according to the embodiment can be calculated by Formula (6) below.

Expression 6

$X = k\int P(\lambda)R_s(\lambda)c_x x(\lambda)d\lambda$ $Y = k\int P(\lambda)R_s(\lambda)c_y y(\lambda)d\lambda$ $Z = k\int P(\lambda)R_s(\lambda)c_z z(\lambda)d\lambda$ Λ(6)

In Formula (6), when the predicted color values are calculated, they are multiplied by the correlation coefficients $c_x$, $c_y$, $c_z$. By multiplying by the correlation coefficients $c_x$, $c_y$, $c_z$ in this way, it is possible to emphasize the respective isochromatic functions $x(\lambda)$, $y(\lambda)$, $z(\lambda)$ by an extent corresponding to the correlation coefficient $c_x$, $c_y$, $c_z$. Consequently, it is possible to increase the contribution to the predicted color values of the isochromatic functions $x(\lambda)$, $y(\lambda)$, $z(\lambda)$ in the waveband which is similar to the target spectral reflectivity $R_t(\lambda)$, where the correlation coefficients $c_x$, $c_y$, $c_z$ relating to the target spectral reflectivity $R_t(\lambda)$ become high, in other words, assume large values. In other words, it is possible to calculate predicted color values in which the waveband where the target spectral reflectivity $R_t(\lambda)$ has a high value makes a large contribution. By using predicted color values of this kind, in the optimization of the ink volume set $\phi$, it is possible to emphasize in particular the waveband where the target spectral reflectivity $R_t(\lambda)$ has a high value.

5-4. Modification Example 4

Figure 22:
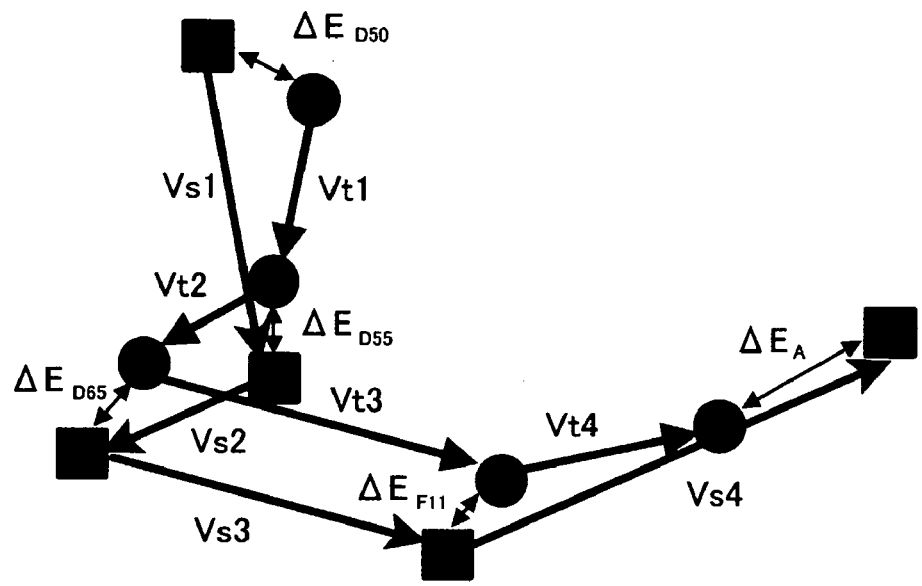
FIG. 22 describes an evaluation value relating to a modification example.

FIG. 22 shows a schematic view of the evaluation value $E(\phi)$ relating to this modification example. In FIG. 22, the target light source to light source color change vectors $V_t 1$ to $V_t 4$ which link the target color values of the respective light sources in the CIELAB space, in the sequence: D50→D55, D55→D65, D65→A, A→F11, are calculated, and the predicted light source to light source color change vectors $V_s 1$ to $V_s 4$ are calculated in a similar fashion for the predicted color values. Therefore, for each of the pairs of target light source to light source color change vectors $V_t 1$ to $V_t 4$ and predicted light source to light source color change vectors $V_s 1$ to $V_s 4$, it is possible to calculate a light source to light source change evaluation index $S(\phi)$ which provides an index of the similarity between the magnitudes and directions of the pair of vectors. Therefore, the evaluation value $E(\phi)$ is defined by Formula (7) below.

Expression 7

$E(\phi) = w_1 \Delta E_{D50} + w_2 \Delta E_{D55} + w_3 \Delta E_{D65} + w_4 \Delta E_A + w_5 \Delta E_{F11} + w_6 S(\phi)$ Λ(7)

By means of the evaluation value $E(\phi)$ given by Formula (7), it is possible to optimize the ink volume set $\phi$ so as to account for the similarity of the color change between light sources.

5-5. Modification Example 5

In the example described above, the spectral reproducibility of a target TG is evaluated on the basis of color values under a plurality of light sources, but at step S140, it is also possible to measure the spectral reflectivity $R(\lambda)$ of the target TG as the target spectral reflectivity $R_t(\lambda)$, and to evaluate the similarity between this target spectral reflectivity $R_t(\lambda)$ and the predicted spectral reflectivity $R_s(\lambda)$ directly. In other words, it is possible for the ECM P3a3 to calculate an evaluation value $E(\phi)$ which is as defined in Formula (8) below.

Expression 8

$$E(\phi) = \sqrt{\frac{\sum \{w(\lambda)D(\lambda)\}^2}{N}}$$

$$D(\lambda) = R_t(\lambda) - R_s(\lambda)$$

Λ (8)

In Formula (8), the difference $D(\lambda)$ between the target spectral reflectivity $R_t(\lambda)$ and the predicted spectral reflectivity $R_s(\lambda)$ is calculated for each wavelength $\lambda$, and a weighting function $w(\lambda)$ which applies a weighting for each wavelength $\lambda$ is multiplied by this difference $D(\lambda)$. The square root of the mean square of this value is calculated as the evaluation value $E(\phi)$. In Formula (8), N means the finite number of divisions of the wavelength %.

In Formula (8), the smaller the evaluation value $E(\phi)$, the smaller the difference which can be achieved between the target spectral reflectivity $R_t(\lambda)$ and the predicted spectral reflectivity $R_s(\lambda)$ at the respective wavelength $\lambda$. In other words, the smaller the evaluation value $E(\phi)$, the greater the similarity that can be achieved between the spectral reflectivity $R(\lambda)$ that is reproduced on the recording medium when the printer 20 prints using the input ink volume set $\phi$ and the target spectral reflectivity $R_t(\lambda)$ obtained from the corresponding target TG. Moreover, according to Formula (1), although the absolute color value indicated by the recording medium and the corresponding target TG when the printer 20 prints using the ink volume set $\phi$ changes in both directions in accordance with change in the light source, providing that the spectral reflectivity $R(\lambda)$ is similar, then it is possible to perceive the same color relatively, irrespective of the change in the light source. Consequently, by using an ink volume set $\phi$ which produces a small evaluation value ($\phi$), it is possible to obtain print results which are perceived as the same color as the target TG under any light source.

Furthermore, in the embodiment, Formula (9) below is used for the weighting coefficient $w(\lambda)$.

Expression 9

$w(\lambda) = x(\lambda) + y(\lambda) + z(\lambda)$ Λ(9)

In Formula (9), the weighting function $w(\lambda)$ is defined by summing together the isochromatic functions $x(\lambda)$, $y(\lambda)$, $z(\lambda)$. It is also possible to normalize the range of the value of the weighting function $w(\lambda)$ by multiplying the whole of the right-hand side of Formula (3) by a prescribed coefficient. According to Formula (1), the higher the value of the isochromatic functions $x(\lambda)$, $y(\lambda)$ and $z(\lambda)$ in a wavelength region, the greater their influence on the color value (L*a*b* value). Consequently, by using a weighting function $w(\lambda)$ obtained by summing together the isochromatic functions $x(\lambda)$, $y(\lambda)$, $z(\lambda)$, it is possible to obtain an evaluation value $E(\phi)$ providing evaluation of a square error which emphasizes the wavelength region that has a greater influence on the colors. For example, in the near ultraviolet wavelength region which is not perceptible to the human eye, $w(\lambda)$ becomes zero and the difference $D(\lambda)$ in this wavelength region does not contribute to increase in the evaluation value $E(\phi)$.

In other words, even if the difference between the target spectral reflectivity $R_t(\lambda)$ and the predicted spectral reflectivity $R_s(\lambda)$ is not necessarily small throughout the whole visible wavelength region, it is still possible to obtain an evaluation value $E(\phi)$ having a small value, provided that the target spectral reflectivity $R_t(\lambda)$ and the predicted spectral reflectivity $R_s(\lambda)$ are similar in the wavelength region which is perceptible to the human eye, and hence it is possible to use the evaluation value $E(\phi)$ as an indicator of the similarity of the spectral reflectivity $R(\lambda)$ which is pertinent to human visual perception.

5-6. Modification Example 6

In the embodiments described above, the regions corresponding to the frames F which have not been selected are printed with the same color as the region apart from the frames F. Of course, there is no requirement for spectral reproducibility in the regions corresponding to the frames F which have not been selected, and therefore color conversion using a 3D-LUT should be carried out similarly to the region apart from the frames F. Moreover, it is also possible to print a pattern, text characters, markings, or the like, in the region apart from that corresponding to the frame F specified as the target TG. It is also possible, for example, to print text characters describing the type of target TG, in the vicinity of the frame F which is specified as a target TG. Moreover, the light sources used for evaluation are not limited to the five types used in the embodiments described above, and it is also possible to use other types of light sources. Of course, the number of light sources used for evaluation is not limited to five, and it is also possible to improve the reproducibility of a target TG using a reduced number of observation light sources such as three light sources, or to achieve reproducibility of the target TG under a larger number of light sources, such as eight light sources.

5-7. Modification Example 7

Figure 23:
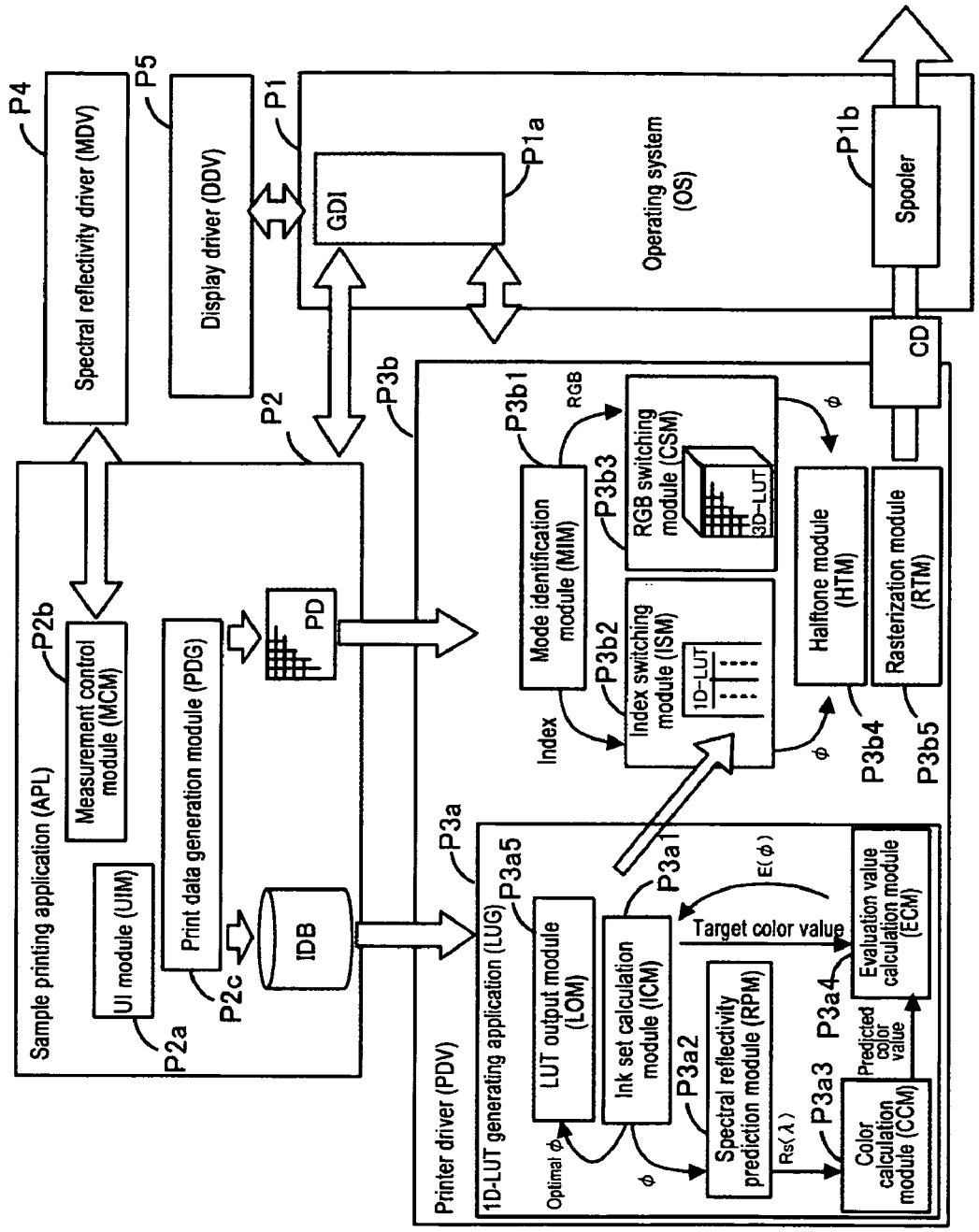
FIG. 23 shows the software composition of a printing system relating to a modification example.
Figure 24:
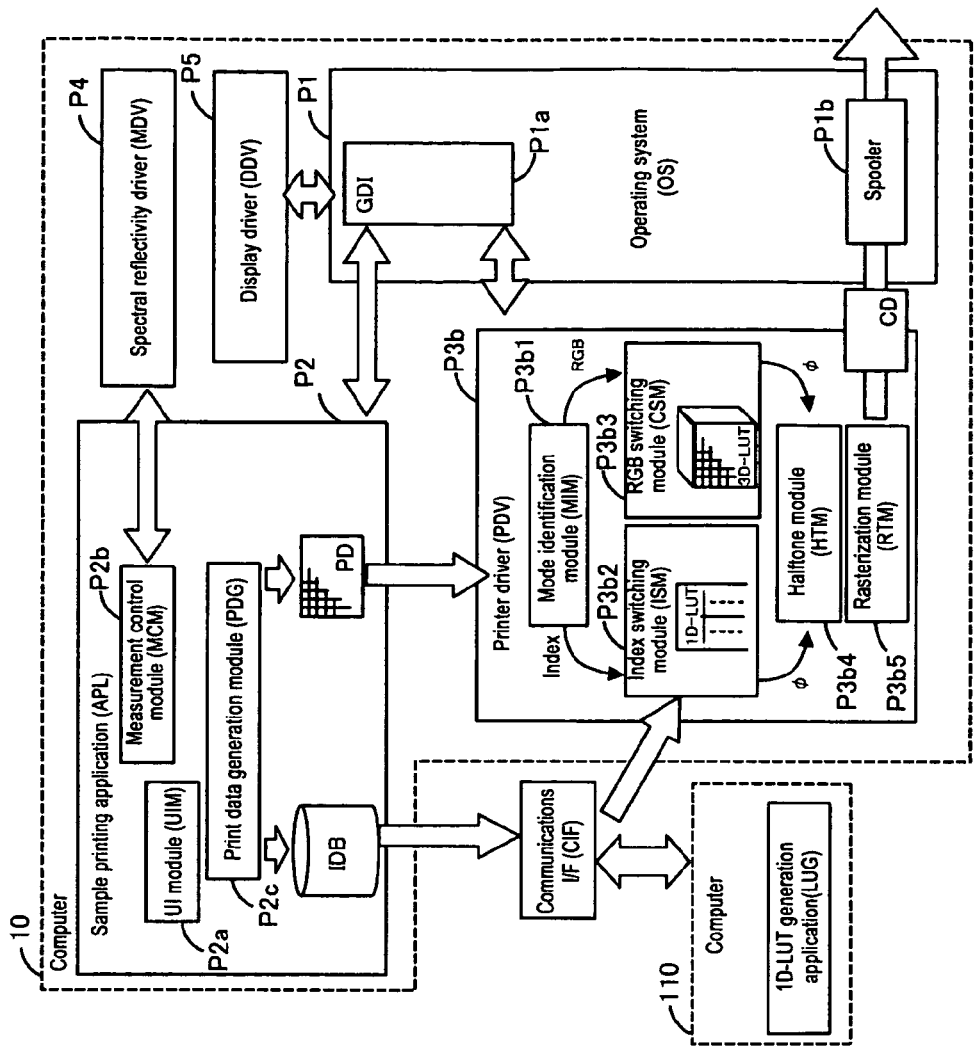
FIG. 24 shows the software composition of a printing system relating to a modification example.

FIGS. 23 to 24 show the software composition of a print system according to a modification of the invention. As shown in FIG. 23, the composition corresponding to the LUG P3a of the embodiments described above may be provided as an internal module of the PDV P3b. Furthermore, as shown in FIG. 24, the composition corresponding to the LUG P3a of the embodiments described above may be executed by another computer 110. In this case, the computer 10 and the computer 110 are connected by a prescribed communications interface CIF, and the 1D-LUT generated by the LUG P3a of the computer 110 is sent to the computer 10 via the communications interface CIF. The communications interface CIF may also operate via the Internet. In this case, the computer 10 is able to perform color conversion by referring to the 1D-LUT acquired from the computer 110 over the Internet. Furthermore, it is also possible to execute the whole of the software composition P1 to P5 in the printer 20. Naturally, the invention can also be achieved in a case where hardware which executes similar processing to the software composition P1 to P5 is incorporated in the printer 20.

5-8. Modification Example 8

Figure 25:
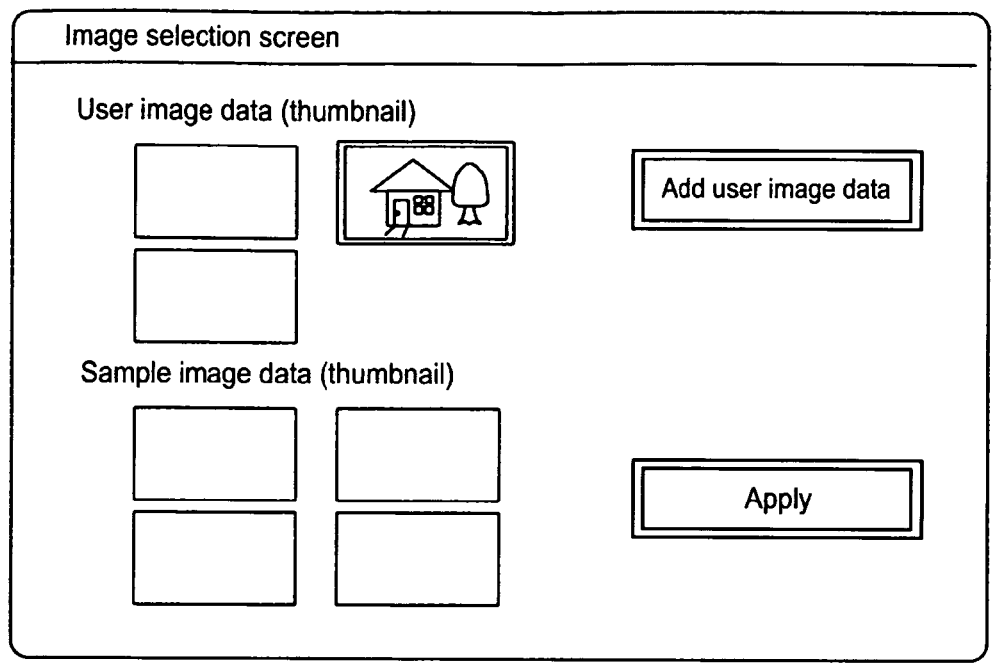
FIG. 25 shows a UI screen relating to a modification example.
Figure 25:
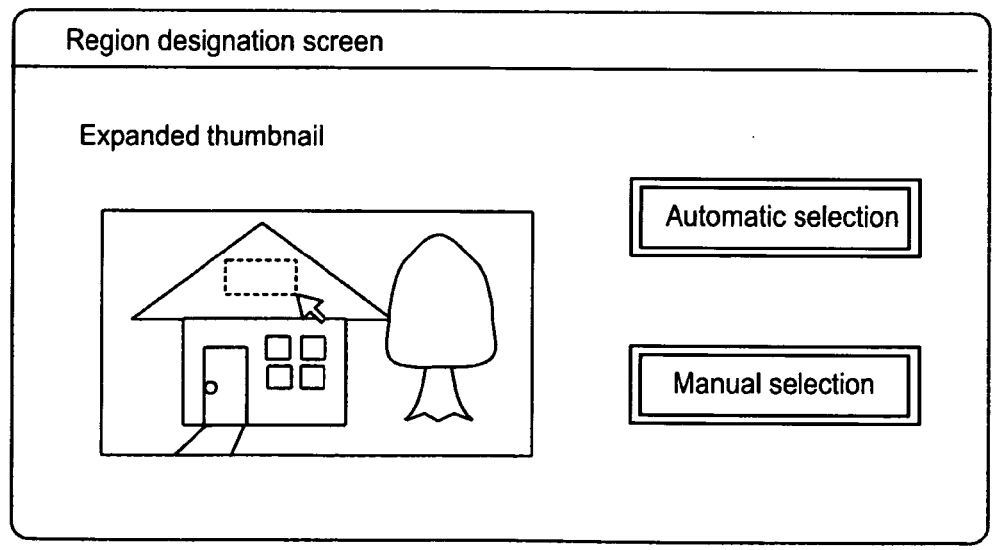

FIG. 25A and FIG. 25B show a UI screen relating to the invention (showing a display corresponding to step S100). In the embodiments described above, target color values under a plurality of light sources are actually measured and an index table which associates these target color values with indices is drawn up, but it is also possible to prepare an index table in which a plurality of indices and target color values are recorded in advance. In the present modification example, an index table is prepared in advance to record associations between indices assigned to respective coating materials manufactured by coating material manufacturers and target color values obtained by measuring a surface onto which these coating materials have been applied. In this index table, display RGB values are also recorded, similarly to the embodiments described above. If an index table has been prepared in advance, then at step S100, processing for selecting a coating material (index) which is to be reproduced in the sample chart SC is carried out by the APL P2.

Firstly, as shown in FIG. 25A, a list containing a plurality of sample image data and thumbnails of user image data is displayed. The sample image data is image data which has been stored previously on the HDD 14, and the user image data is image data which has been read in from an image input device, such as a digital still camera. Furthermore, it is also possible to use image data that has been downloaded from the Internet as the user image data. The thumbnails can be clicked with the mouse 50b, and a frame surround is displayed about the thumbnail which has been clicked most recently. An "Apply" button is provided on the UI screen in FIG. 25A, and by clicking on this "Apply" button, the selection of user image data or sample image data corresponding to the thumbnail marked with the frame is confirmed.

When the selection has been confirmed, the display switches to the UI screen in FIG. 25B. An expanded thumbnail of the established user image data or sample image data is displayed on the UI screen. A "Manual Selection" button and an "Automatic Selection" button are provided on the UI screen in FIG. 25B. If the manual selection button is selected, then a mouse icon is displayed over the expanded thumbnail, and the user can use a drag and drop action to specify the top left corner and bottom right corner of a desired square-shaped designated region. Thereby, the APL P2 requests the DDV P5 for the RGB values used to display the pixels belonging to the designated square-shaped region on the display monitor 40. The DDV P5 outputs the RGB values used to display the pixels of the expanded thumbnail on the display monitor 40, and hence the RGB values of the pixels belonging to the designated region can be identified. When the RGB values of the pixels belonging to the designated region have been obtained, the APL P2 averages the RGB values of the pixels and this average is set as the designated RGB value. On the other hand, if the automatic selection button is clicked, then the APL P2 acquires the RGB values of all of the pixels of the expanded thumbnail from the DDV P5 and the most representative RGB value of these is taken as the designated RGB value. For example, a histogram of the RGB values of all of the pixels of the expanded thumbnail may be created and the RGB value having the greatest frequency may be set as the designated RGB value. When the designated RGB value has been obtained in this way, then the display RGB value which is closest to the designated RGB value is found from the index table. Here, the index having the shortest Euclidean distance in the RGB space between the designated RGB value and the respective display RGB values is found. The display RGB value having the shortest Euclidean distance from the designated RGB value is denoted as the "most proximate RGB value". Next, the respective display RGB values (including the most proximate RGB value) are converted to an HSV value by a commonly known conversion formula.

Figure 26:
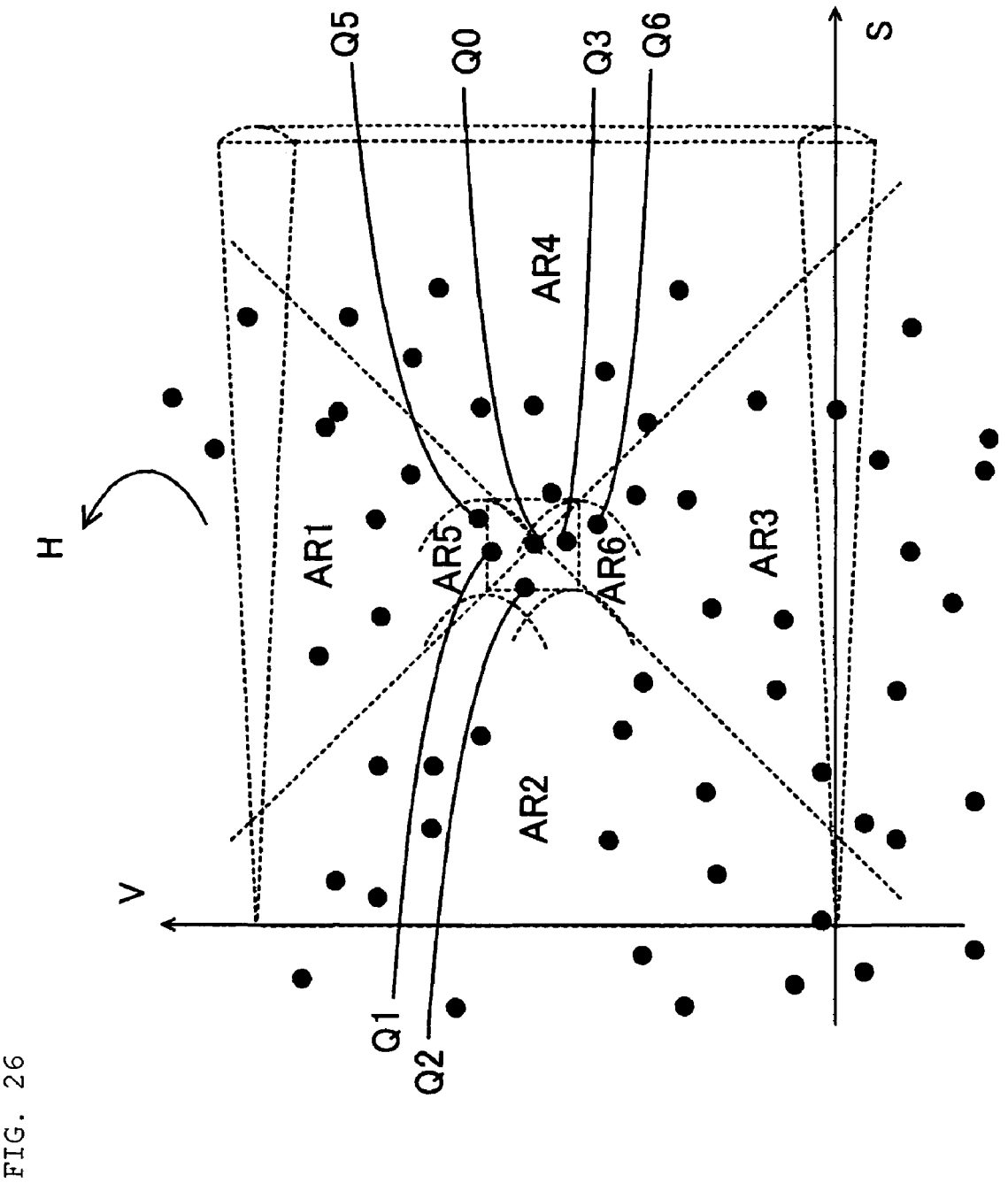
FIG. 26 shows a HSV space.

FIG. 26 shows the display RGB values which have been converted to HSV values, as plotted in an HSV space. In FIG. 26, the HSV value obtained by converting the most proximate RGB value is indicated by point Q0. In the HSV space, a space having a fan-shaped cross-section of a range of ±5 degrees is specified with respect to the color hue angle (H value) of the HSV value (Q0) obtained by conversion from the most proximate RGB value. In other words, a space is specified in which the color hue angle is close to the most proximate RGB value. Next, two subsidiary axes SA which intersect at 45 degrees with the value axis (V axis) and the saturation axis (S axis) are generated, and first to fourth areas AR1 to AR4 which are divided by these subsidiary axes SA are defined accordingly. The characteristics of the first area AR1 are such that the hue angle H is close to the most proximate RGB value and the value V is greater than the most proximate RGB value. Furthermore, the characteristics of the second area AR2 are such that the hue angle H is close to the most proximate RGB value and the saturation S is slightly smaller than the most proximate RGB value. The characteristics of the third area AR3 are such that the hue angle H is close to the most proximate RGB value and the value V is smaller than the most proximate RGB value. The characteristics of the fourth area AR4 are such that the hue angle H is close to the most proximate RGB value and the saturation S is greater than the most proximate RGB value.

The index table is searched to find the display RGB value which corresponds to the HSV value belonging to the first area AR1 that has a value V closest to the value V of point Q0 (this is called the "first proximate RGB value" and is denoted by point Q1 in the HSV space). Similarly, the index table is searched to find the display RGB value which corresponds to the HSV value belonging to the third area AR3 that has a value V closest to the value V of point Q0 (this is called the "third proximate RGB value" and is denoted by point Q3 in the HSV space). The first proximate RGB value can be regarded as an RGB value which has a close hue angle H to the most proximate RGB value and a slightly greater value V than the most proximate RGB value. On the contrary, the third proximate RGB value can be regarded as an RGB value which has a close hue angle H to the most proximate RGB value and a slightly smaller value V. Next, the index table is searched to find the display RGB value which corresponds to the HSV value belonging to the second area AR2 that has a saturation S closest to the saturation S of point Q0 (this is called the "second proximate RGB value" and is denoted by point Q2 in the HSV space). Similarly, the index table is searched to find the display RGB value which corresponds to the HSV value belonging to the fourth area AR4 that has a saturation S closest to the saturation S of point Q0 (this is called the "fourth proximate RGB value" and is denoted by point Q4 in the HSV space). The second proximate RGB value can be regarded as an RGB value which has a close hue angle H to the most proximate RGB value and a slightly lower saturation S than the most proximate RGB value. On the contrary, the fourth proximate RGB value can be regarded as an RGB value which has a close hue angle H to the most proximate RGB value and a slightly greater saturation S.

Furthermore, as shown in FIG. 26, a circular ring-shaped space having a value V and saturation S in a range of ±5 with respect to the value V and saturation S of the HSV value (Q0) converted from the most proximate RGB value is also specified in the HSV space. In other words, a space where the value V and the saturation S are close to the most proximate RGB value is specified. Next, the region of this ring-shaped space which has a larger hue angle H than the HSV value converted from the most proximate RGB value is set as a fifth area AR5 and the region which has a smaller hue angle H is set as a sixth area AR6. Next, the index table is searched to find the display RGB value which corresponds to the HSV value belonging to the fifth area AR5 that has a hue angle H closest to point Q0 (this is called the "fifth proximate RGB value" and denoted by point Q5 in the HSV space). Similarly, the index table is searched to find the display RGB value which corresponds to the HSV value belonging to the sixth area AR6 that has a hue angle H closest to point Q0 (this is called the "sixth proximate RGB value" and is denoted by point Q6 in the HSV space). The fifth proximate RGB value can be regarded as an RGB value which has a close value V and saturation S to the most proximate RGB value and a slightly greater hue angle H than the most proximate RGB value. On the contrary, the sixth proximate RGB value can be regarded as an RGB value which has a close value V and saturation S to the most proximate RGB value and a slightly smaller hue angle H than the most proximate RGB value. When the most proximate RGB value and the first to sixth proximate RGB values have been identified successfully as described above, the next UI screen is displayed.

Figure 27:
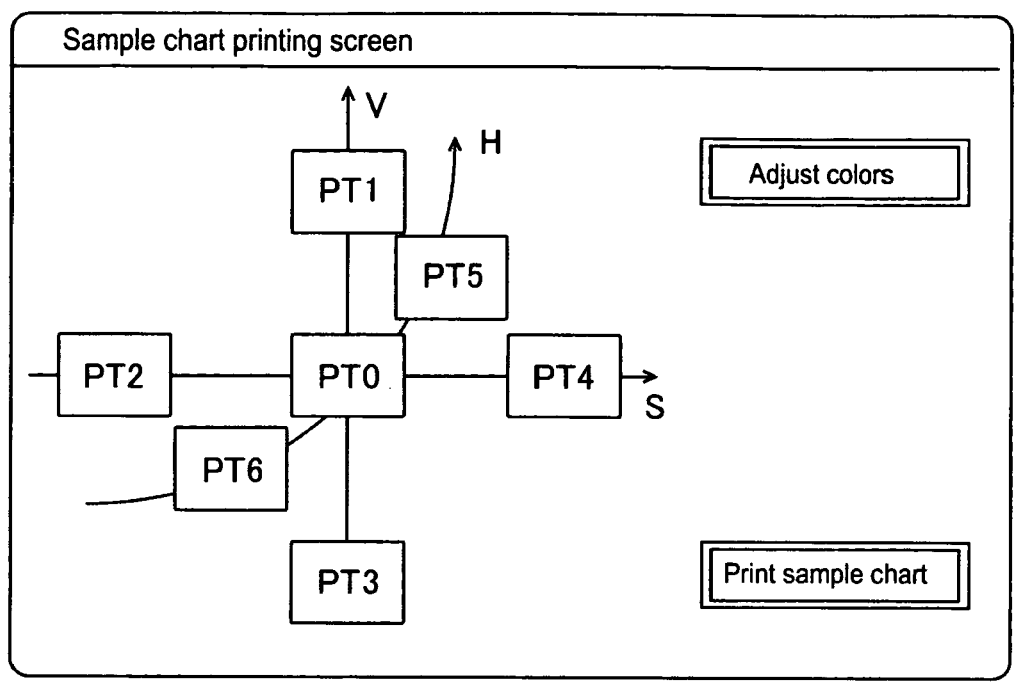
FIG. 27 shows a UI screen relating to a modification example.

FIG. 27 shows the UI screen which is displayed next. This UI screen shows a local view of the HSV space, with the HSV axes being depicted respectively. At the point of intersection of these axes, a square-shaped main display patch PT0 which is blocked in with the most proximate RGB value is displayed. On the other hand, a first display patch PT1 which is blocked in with the first proximate RGB value is displayed on the higher value V side of the V axis, and a third display patch PT3 which is blocked in with the third proximate RGB value is displayed on the lower value V side of the V axis. Furthermore, a fourth display patch PT4 which is blocked in with the fourth proximate RGB value is displayed on the higher saturation S side of the S axis, and a second display patch PT2 which is blocked in with the second proximate RGB value is displayed on the lower saturation S side of the S axis. Furthermore, a fifth display patch PT5 which is blocked in with the fifth proximate RGB value is displayed on the higher hue angle H side of the H axis, and a sixth display patch PT6 which is blocked in with the sixth proximate RGB value is displayed on the lower hue angle H side of the H axis.

The main display patch PT0 is shown using the display RGB value of the display RGB values registered in the index table which is closest to the specified RGB value designated by the user. In other words, of the coating materials in the indices (of coating materials) registered in the index table, the color of the coating material which is closest to the specified RGB value designated by the user is displayed. On the other hand, the first to sixth display patches PT1 to PT6 can be displayed using the colors of coating materials, chosen from amongst the indices (of coating materials) registered in the index table, which are close to the specified RGB value designated by the user (the most proximate RGB value) and which have slightly different hue H, value V and saturation S with respect to the most proximate RGB value. Consequently, it is possible to view the color of a coating material which is close to the specified RGB value specified by the user and the colors of coating materials which are close to this color.

The UI screen in FIG. 27 contains an "Adjust" button and a "Print Sample Chart" button. When the "Adjust" button is clicked, the APL P2 monitors the operation of the mouse 50b. Although not shown in FIG. 27, the mouse 50b also has a wheel, in addition to the click button. When the "Adjust" button has been clicked, the APL P2 monitors the direction of movement of the mouse 50b and the rotation of the wheel, until the click button is next operated. The UI screen in FIG. 27 is then updated as described below, in accordance with the direction of movement of the mouse 50b and the rotation of the wheel.

When the mouse 50b has been moved by a prescribed amount in the upward (rearward) direction, then the most proximate RGB value is substituted with the current first proximate RGB value. Upon substituting the most proximate RGB value with the current first proximate RGB value, new first to sixth proximate RGB values are calculated by the procedure described above. The UI screen in FIG. 27 is updated in such a manner that a main display patch PT0 and first to sixth display patches PT1 to PT6 are displayed on the basis of the new most proximate RGB value and first to sixth proximate RGB values. By this means, the main display patch PT0 and the first to sixth display patches PT1 to PT6 are shifted to colors given by coating materials on the higher lightness side. On the other hand, if the mouse 50b is moved by a prescribed amount in the downward (near side) direction, then the most proximate RGB value is substituted with the current third proximate RGB value and the UI screen in FIG. 27 is then updated in such a manner that the new main display patch PT0 and first to sixth display patches PT1 to PT6 are displayed. By this means, the main display patch PT0 and the first to sixth display patches PT1 to PT6 are shifted to colors given by coating materials on the lower lightness side.

If the mouse 50b is moved by a prescribed amount in the rightward direction, then the most proximate RGB value is substituted with the current fourth proximate RGB value and the UI screen in FIG. 27 is then updated in such a manner that the new main display patch PT0 and first to sixth display patches PT1 to PT6 are displayed. In a similar fashion, if the mouse 50b is moved by a prescribed amount in the leftward direction, then the most proximate RGB value is substituted with the current second proximate RGB value and the UI screen in FIG. 27 is then updated in such a manner that the new main display patch PT0 and first to sixth display patches PT1 to PT6 are displayed. If the wheel of the mouse 50b is rotated by a prescribed amount in the rearward direction, then the most proximate RGB value is substituted with the current fifth proximate RGB value and the UI screen in FIG. 27 is then updated in such a manner that the new main display patch PT0 and first to sixth display patches PT1 to PT6 are displayed. If the wheel of the mouse 50b is rotated by a prescribed amount in the near side direction, then the most proximate RGB value is substituted with the current sixth proximate RGB value and the UI screen in FIG. 27 is then updated in such a manner that the new main display patch PT0 and first to sixth display patches PT1 to PT6 are displayed.

By this means, it is possible to change the color of the main display patch PT0 progressively to either of the first to sixth display patches PT1 to PT6. More specifically, it is possible to shift the color of the main display patch PT0 to a higher or lower lightness, a higher or lower saturation, and a greater or smaller hue angle, amongst the display RGB values which are registered in the index table. In other words, the color of the main display patch PT0 can be changed progressively along the H axis, S axis and V axis, by operating the mouse 50b, and hence the sensory perception of the color of the main display patch PT0 can be adjusted. Since the main display patch PT0 and the first to sixth display patches PT1 to PT6 are displayed on the basis of display RGB values which are found from the index table, then the colors given by any of the coating materials are displayed. By clicking the button of the mouse 50b, the updating process of the UI screen in FIG. 27 based on the operation of the mouse 50b is ended. By this means, when a main display patch PT0 which is to the user's liking has been selected, then the updating of the UI screen in FIG. 27 can be terminated.

By clicking on the "Print Sample Chart" button on the UI screen in FIG. 27, the procedure switches to step S170 in FIG. 3 and print data is generated. Here, basically, print data PD for printing the UI screen in FIG. 27 is generated. In other words, the main display patch PT0 and the first to sixth display patches PT1 to PT6 are printed. Here, the pixels of the print data PD apart from those of the region corresponding to the main display patch PT0 and the first to sixth display patches PT1 to PT6 store RGB values. On the other hand, the pixels corresponding to the main display patch PT0 and the first to sixth patches PT1 to PT6 store, instead of RGB values, indices which are associated in the index table with the display RGB values which display the main display patch PT0 and the first to sixth display patches PT1 to PT6. By this means, the main display patch PT0 and the first to sixth display patches PT1 to PT6 are printed so as to reproduce the target color values of the coating materials associated with the respective indices under a plurality of light sources.

In the sample chart SC printed in this way, it is possible to print a main display patch PT0 which reproduces the target color values under a plurality of light sources of a coloring material which produces a color close to the color specified as a region, or the like, on an expanded thumbnail by the user. Furthermore, it is also possible to print first to sixth display patches PT1 to PT6 which reproduce the target color values under a plurality of light sources of a coating material which produces a color close to the target display patch PT0. Even in cases where the reproduction results of the main display patch PT0 differ to some extent from the reproduction intended by the user, it is possible to select a desired coating material from amongst the first to sixth display patches PT1 to PT6 which show colors which are close to the main display patch PT0.

What is claimed is:

1. A printing control device that specifies to a printing apparatus a coloring material volume set which is a combination of usage amounts of coloring materials when the printing apparatus executes printing by depositing a plurality of coloring materials onto a recording medium, comprising:
   a print data acquisition unit that acquires print data of pixels having an information area for storing an index associated with the coloring material volume set;
   a color conversion unit that acquires the coloring material volume set corresponding to the index stored in the pixel; and
   a printing control unit that executes printing by specifying to the printing apparatus the coloring material volume set acquired by the color conversion unit.

2. The printing control device according to claim 1, wherein
   color information representing a color can be stored, in place of the index, in the information areas of the plurality of pixels; and
   the color conversion unit acquires the coloring material volume set corresponding to the index in respect of the pixels which have the index stored in the data area, and acquires the coloring material volume set corresponding to the color represented by the color information in respect of the pixels which have color information stored in the data area.

3. The printing control device according to claim 1, wherein
   the index is associated with a prescribed target; and
   the color conversion unit acquires the coloring material volume set in respect of pixels where the index has been stored by referring to a database in which the index corresponding to the target is associated with the coloring material volume set that causes the spectral reflectivity or color value under a plurality of light sources of the target to be reproduced on the recording medium when printing is executed by the printing apparatus.

4. The printing control device according to claim 1, wherein the information area includes:

a second area that stores either the index or the color information; and a first area that stores identification information that identifies which of the index and the color information is stored in the second area.

5. A printing system, comprising:

a printing apparatus that executes printing by depositing a plurality of coloring materials onto a recording medium;

a printing control device that specifies to the printing apparatus a coloring material volume set which is a combination of usage amounts of coloring materials on the basis of print data generated by a print data generation device, and causes printing to be executed on the basis of this coloring material volume set, the printing system further comprising:

a print data generation unit, which generates print data of pixels having an information area for storing an index associated with the coloring material volume set;

a color conversion unit that acquires the coloring material volume set corresponding to the index stored in the pixel; and a printing execution unit which executes printing on the basis of the coloring material volume set acquired by the color conversion unit.

6. A non-transitory computer-readable printing control program that causes a computer to execute a function of specifying to a printing apparatus a coloring material volume set which is a combination of usage amounts of coloring materials when the printing apparatus executes printing by depositing a plurality of coloring materials onto a recording medium, the program further causing a computer to execute:

a print data acquisition function of acquiring print data of pixels having an information area for storing an index associated with the coloring material volume set;

a color conversion function of acquiring a coloring material volume set corresponding to the index stored in the pixel; and a printing control function of causing printing to be executed by specifying to the printing apparatus the coloring material volume set acquired by the color conversion function.

* * * * *